(12) United States Patent
Saccomanno et al.

(10) Patent No.: US 6,934,080 B2
(45) Date of Patent: Aug. 23, 2005

(54) HIGH EFFICIENCY VIEWING SCREEN

(75) Inventors: Robert J. Saccomanno, Montville, NJ (US); Kanghua Lu, Waldwick, NJ (US)

(73) Assignee: Honeywell International, Inc., Morristown, NJ (US)

( * ) Notice: Subject to any disclaimer, the term of this patent is extended or adjusted under 35 U.S.C. 154(b) by 70 days.

(21) Appl. No.: 10/666,342

(22) Filed: Sep. 22, 2003

(65) Prior Publication Data

US 2004/0105159 A1 Jun. 3, 2004

Related U.S. Application Data

(60) Provisional application No. 60/470,233, filed on May 14, 2003, and provisional application No. 60/411,863, filed on Sep. 20, 2002.

(51) Int. Cl.[7] .................. G03B 21/56; G03B 21/60; G02B 27/02; G02B 27/28
(52) U.S. Cl. .................. 359/460; 359/449; 359/457; 359/437; 359/501
(58) Field of Search .................. 359/460, 449, 359/454, 457, 437, 501; 349/64

(56) References Cited

U.S. PATENT DOCUMENTS

| | | | |
|---|---|---|---|
| 1,666,808 A | 4/1928 | Buchner | 359/455 |
| 1,942,841 A | 1/1934 | Shimizu | 359/455 |
| 2,180,113 A | 11/1939 | Land | 359/453 |
| 2,287,556 A | 6/1942 | Land | 359/452 |
| 2,362,573 A | 11/1944 | MacNeille | 359/455 |
| 2,364,369 A | 12/1944 | Jelley et al. | 359/460 |
| 2,378,252 A | 6/1945 | Staehle et al. | 359/453 |
| 2,380,241 A | 7/1945 | Jelley et al. | 359/460 |

(Continued)

FOREIGN PATENT DOCUMENTS

| | | |
|---|---|---|
| EP | 1 186 939 | 3/2002 |
| WO | WO 00/70400 | 11/2000 |
| WO | WO 01/86343 | 11/2001 |
| WO | WO 02/059691 | 8/2002 |

OTHER PUBLICATIONS

B. Larson et al., "Image Noise in High Resolution Rear Projection Screens" Cockpit Displays IX: Displays for Defense Applications, Darrel G. Hopper, Proceedings of SPIE vol. 4712, 2002.

Saleh et al. "Fundamentals of Photonics" pp 203–208, 1991.

Goldenberg et al. "Rear Projection Screens for Light Valve Projection Systems" vol. 3013, 1997, pp. 49–59.

Shimizu, "Invited Paper: Scrolling Color LCOS for HDTV Rear Projection" 2001 SID International Symposium Digest of Technical Papers, vol. 32, 2001 pp. 1072–1075.

Copy of International Search Report.

*Primary Examiner*—Rodney Fuller
*Assistant Examiner*—Magda Cruz
(74) *Attorney, Agent, or Firm*—Shaw Pittman LLP

(57) ABSTRACT

A low-scatter polarization-preserving multilayer viewing screen. A substrate D, preferably a volume diffuser, for increasing the divergence of information-coded-light while preserving its polarization sense A as it passes therethrough has a discrimination of at least 2:1 within a viewing zone. An absorbing polarizer on one or both sides of D and aligned to pass polarization state A. In one embodiment, there is provided a polarization-state phase-shift layer for modifying the polarization state of forward-scatter and/or back-scatter that total internally reflects within the viewing screen into the state opposite of A. The phase-shift layer being located at any position between the polarizer and an outermost surface of the viewing screen through which said information-coded light passes.

26 Claims, 21 Drawing Sheets

U.S. PATENT DOCUMENTS

| | | | | |
|---|---|---|---|---|
| 3,262,359 A | 7/1966 | Carpenter | ............... | 353/122 |
| 3,279,314 A | 10/1966 | Miller | ............... | 359/453 |
| 3,437,405 A | 4/1969 | Northrop | ............... | 359/592 |
| 3,712,707 A | 1/1973 | Henkes, Jr. | ............... | 359/448 |
| 3,840,695 A | 10/1974 | Fischer | ............... | 348/761 |
| 3,909,111 A | 9/1975 | Meyerhofer | ............... | 359/460 |
| 4,035,068 A | 7/1977 | Rawson | ............... | 353/122 |
| 4,153,654 A | 5/1979 | Maffitt et al. | ............... | 264/2.5 |
| 4,155,630 A | 5/1979 | Ih | ............... | 359/707 |
| 4,174,874 A | 11/1979 | Lee | ............... | 439/104 |
| 4,340,275 A | 7/1982 | Henkes | ............... | 359/456 |
| 4,373,065 A | 2/1983 | Prest, Jr. | ............... | 525/132 |
| 4,536,063 A | 8/1985 | Southwell | ............... | 359/488 |
| 4,697,407 A | 10/1987 | Wasserman | ............... | 57/238 |
| 5,161,041 A | 11/1992 | Abileah et al. | ............... | 349/62 |
| 5,272,473 A | 12/1993 | Thompson et al. | ............... | 345/7 |
| 5,481,385 A | 1/1996 | Zimmerman et al. | ............... | 349/62 |
| 5,609,939 A | 3/1997 | Petersen et al. | ............... | 428/141 |
| 5,629,784 A | 5/1997 | Abileah et al. | ............... | 349/112 |
| 5,666,174 A * | 9/1997 | Cupolo, III | ............... | 349/64 |
| 5,751,388 A * | 5/1998 | Larson | ............... | 349/96 |
| 5,889,615 A | 3/1999 | Dreyer et al. | ............... | 359/529 |
| 5,973,834 A | 10/1999 | Kadaba et al. | ............... | 359/490 |
| 6,010,747 A | 1/2000 | Beeson et al. | ............... | 427/162 |
| 6,011,528 A | 1/2000 | Inbar et al. | ............... | 345/77 |
| 6,012,818 A | 1/2000 | Araki | ............... | 138/172 |
| 6,060,157 A | 5/2000 | LaPerre et al. | ............... | 428/325 |
| 6,123,877 A | 9/2000 | Clabburn | ............... | 264/1.34 |
| 6,163,402 A | 12/2000 | Chou et al. | ............... | 359/443 |
| 6,174,394 B1 | 1/2001 | Gvon et al. | ............... | 156/100 |
| 6,201,045 B1 | 3/2001 | Koike | ............... | 524/81 |
| 6,239,907 B1 | 5/2001 | Allen et al. | ............... | 359/443 |
| 6,248,859 B1 | 6/2001 | Caruso et al. | ............... | 528/196 |
| 6,261,664 B1 | 7/2001 | Beeson et al. | ............... | 428/141 |
| 6,268,941 B1 | 7/2001 | Halldorsson | ............... | 359/1 |
| 6,317,169 B1 | 11/2001 | Smith | ............... | 348/744 |
| 6,381,068 B1 | 4/2002 | Harada et al. | ............... | 359/443 |
| 6,388,661 B1 | 5/2002 | Richards | ............... | 345/204 |
| 6,421,103 B2 | 7/2002 | Yamaguchi | ............... | 349/61 |
| 6,421,148 B2 | 7/2002 | Steiner | ............... | 359/15 |
| 6,428,198 B1 | 8/2002 | Saccomanno et al. | ............... | 362/559 |
| 6,445,487 B1 | 9/2002 | Roddy et al. | ............... | 359/278 |
| 6,527,410 B2 * | 3/2003 | Yamaguchi | ............... | 362/243 |
| 6,768,586 B2 * | 7/2004 | Sahouani et al. | ............... | 359/491 |

* cited by examiner

Screen Transmittance Measurements

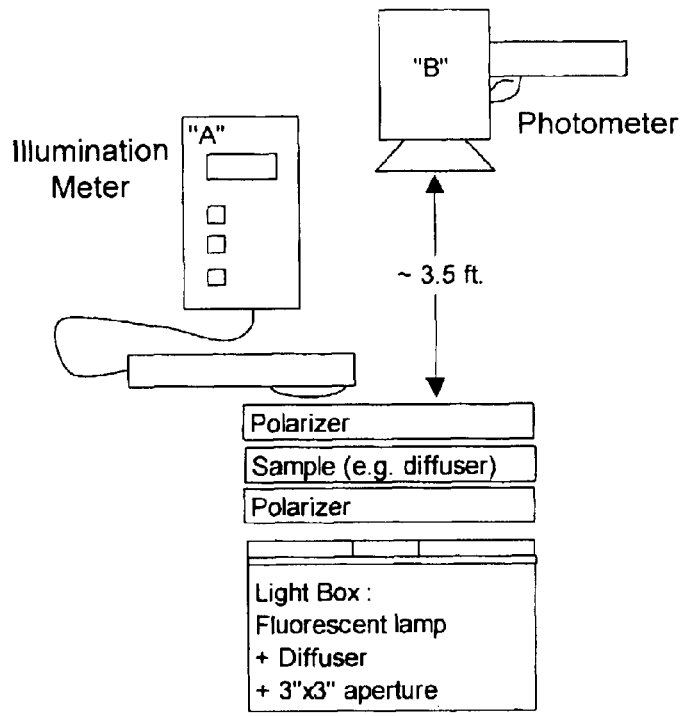

| Measured Data | | | |
|---|---|---|---|
| Measured w/ INS DX200 Illumination Meter ("A") | | | |
| | Original diffuser film (1) | Ruggedized diffuser (2) | No diffuser |
| Parallel linear polarizers | 1,612.0 | 1,742.0 | 2,520.0 |
| Crossed linear polarizers | 301.0 | 203.0 | 92.9 |
| Discrimination ratio | 5.4 | 8.6 | 27.1 |
| | | | |
| Measured w/ Minolta handheld photometer ("B") | | | |
| | Original diffuser film (1) | Ruggedized diffuser (2) | No diffuser |
| Parallel linear polarizers | 2,380.0 | 2,590.0 | 3,300.0 |
| Crossed linear polarizers | 196.0 | 108.0 | 1.6 |
| Discrimination ratio | 12.1 | 24.0 | 2,062.5 |
| | | | |
| (1) Same as "DIFF" in Fig. 10 | | | |
| (2) Same as AR/DIFF/AR in Fig. 10 | | | |

Figure 11

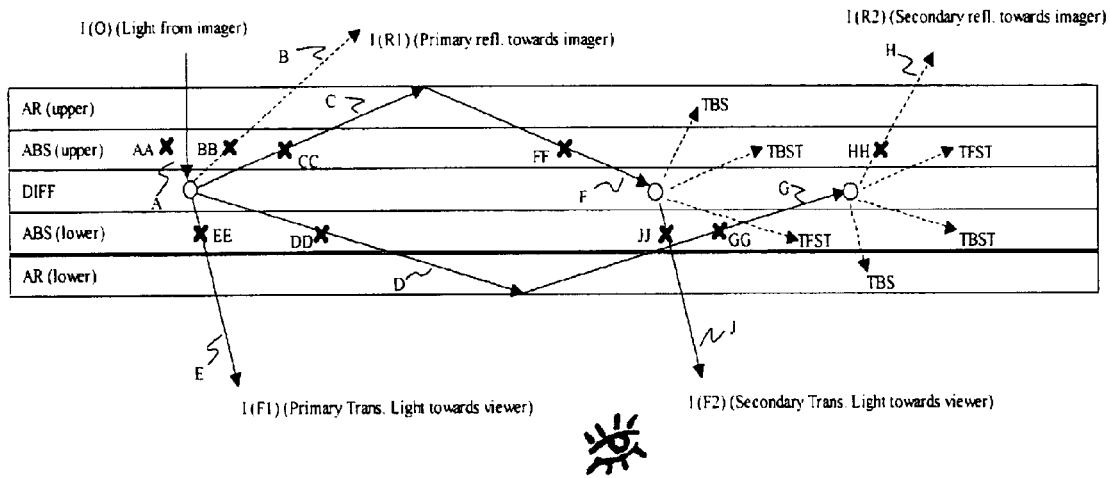

| TBS | TIR light that is back-scattered |
|---|---|
| TBST | TIR light that is back-scattered into more TIR light |
| TFS | TIR light that is forward-scattered |
| TFST | TIR light that is forward-scattered into more TIR light |
| | |
| AR | Antireflection layer |
| ABS | Absorbing layer |
| ✗ | Denotes absorption |
| DIFF | Diffuser |
| I(O) | Ambient light incident on screen |
| I(R1) | Primary reflection component |
| I(R2) | Secondary reflection component |
| I(F) | Ambient light scattered towards the image source |

Figure 12

High Ambient Contrast Calculations $$CR_{HA} = \frac{(Y + \%D*D + \%S*S)}{(\frac{Y}{CR_{DA}} + \%D*D + \%S*S)}$$

| Diffuse ambient | D | 45 fc 484 lux | D | 45 fc 484 lux | D | 45 fc 484 lux |
|---|---|---|---|---|---|---|
| Specular reflectance | %S | 1.0% | %S | 1.0% | %S | 1.0% |
| Specular ambient | S | 100 fL | S | 100 fL | S | 100 fL |
| Dark Ambient Contrast Ratio | $CR_{DA}$ | 300 | $CR_{DA}$ | 300 | $CR_{DA}$ | 300 |
| Luminance | Y | 100 fL | Y | 10 fL | Y | 1 fL |
| Diffuse Reflectance %D | High Ambient Contrast Ratio $CR_{HA}$ | | Diffuse Reflectance %D | High Ambient Contrast Ratio $CR_{HA}$ | Diffuse Reflectance %D | High Ambient Contrast Ratio $CR_{HA}$ |
| 0.6% | 63.2 | | 0.6% | 8.6 | 0.6% | 1.8 |
| 0.8% | 59.9 | | 0.8% | 8.2 | 0.8% | 1.7 |
| 1.0% | 56.9 | | 1.0% | 7.7 | 1.0% | 1.7 |
| 1.2% | 54.2 | | 1.2% | 7.3 | 1.2% | 1.6 |
| 1.4% | 51.8 | | 1.4% | 7.0 | 1.4% | 1.6 |
| 1.6% | 49.5 | | 1.6% | 6.7 | 1.6% | 1.6 |
| 1.8% | 47.5 | | 1.8% | 6.4 | 1.8% | 1.5 |
| 2.0% | 45.6 | | 2.0% | 6.2 | 2.0% | 1.5 |
| 3.0% | 38.1 | | 3.0% | 5.2 | 3.0% | 1.4 |
| 4.0% | 32.8 | | 4.0% | 4.5 | 4.0% | 1.4 |
| 5.0% | 28.8 | | 5.0% | 4.0 | 5.0% | 1.3 |
| 6.0% | 25.7 | | 6.0% | 3.7 | 6.0% | 1.3 |

Room ambient lighting
    Movie Theatre with emergency lights on approx. 50-80 LUX
    Typical office theatrette 120-150 LUX
    Ballroom 150-200 LUX (dimmed for presentations)
    Training room dimmed 200-250 LUX
    Training room full light 350-450 LUX
    Source : http://www.dvmg.com.au/iti-f1.html

Figure 13

HIGH EFFICIENCY VIEWING SCREEN

This application claims the benefit of U.S. Provisional Application No. 60/411,863, filed Sep. 20, 2002, and U.S. Provisional Application No. 60/470,233, filed May 14, 2003, which are both incorporated herein by reference in their entirety.

BACKGROUND

1. Field of the Invention

The present invention is directed to viewing screens, sometimes referred to as projection-screens, imaging-screens, or diffusion-screens. More particularly, the present invention is directed to a viewing screen having high resolution, low cost, high transmittance, low retroreflection effects, and high ambient light rejection.

2. Background of the Invention

A brief summary of screen technologies is set forth below.

Buchner (U.S. Pat. No. 997,899 and U.S. Pat. No. 1,666,808) describes daylight projection screens based on lenticular elements along with an overall absorbing filter for enhanced daylight readability.

Shimizu (U.S. Pat. No. 1,942,841) describes a lenticular screen with an absorbing filter having clear apertures for passing the projected light.

Land (U.S. Pat. No. 2,180,113) describes a non-depolarizing diffusion screen made up of an emulsion between transparent plates, wherein the emulsion consists of a plurality of light transparent media having different indices of refraction, each several microns in diameter, forming an overall layer thickness of about 10 mils. It is suggested to keep the index difference small so that the ratio of refracted to reflected light is high. Interestingly, no details are given as to why the screen does not exhibit depolarization.

MacNeille (U.S. Pat. No. 2,362,573) describes a front projection screen having a circular polarizer with clear apertures. Projected light, after being polarized, strikes a lenticular element with a reflective coating at the back side of the screen. This projected light then passes back through the clear apertures. Ambient light is first circularly polarized, and then attains the opposite polarization sense after reflection from the back side of the lenticular element. Since the ambient light is off-axis, it will not exit through the aperture, and therefore will be absorbed.

Jelley et al. (U.S. Pat. No. 2,364,369 and U.S. Pat. No. 2,380,241) describe the combination of diffuser and circular polarizer. Both surface diffusers (FIG. 4 of the '369) and volume diffusers (FIG. 5 of the '241) are described.

Staehle et al. (U.S. Pat. No. 2,378,252) describe the use of embedding spheres into a black absorptive layer that resides on a transparent substrate. Ideally, the spheres and the substrate have similar refractive indices in order to prevent total internal reflection within a sphere.

Miller (U.S. Pat. No. 3,279,314) describes an array of flat-topped conical projections, having there imposed a reflective coating (except for the flat-top), followed by either an absorptive coating on the projections, or by filling in the regions between projections with absorptive material. Additionally, the projections can have an additional diffusing element on their tips.

Northrop (U.S. Pat. No. 3,437,405) describes fibers generally aligned, running parallel to the screen surface, and embedded within a resin, providing divergence predominately in one axis.

Meyerhofer (U.S. Pat. No. 3,909,111) describes recording a three dimensional interference pattern into a gelatin film using coherent light which has passed through a diffusing medium. The resulting structure exhibits predetermined scattering characteristics. Care has been taken to avoid specifically calling this a hologram.

Zimmerman et al. (U.S. Pat. No. 5,481,385) utilize an approach similar to Miller, however the conical projections operate on the principal of total internal reflection (TIR) by way of a low index fill containing black particles.

Petersen et al. (U.S. Pat. No. 5,609,939) describe recording a three dimensional interference pattern into a photo-sensitive film using coherent light that has passed through a holographic diffuser. The resulting surface structure exhibits controllable scattering characteristics and very high resolution properties.

Abileah et al. (U.S. Pat. No. 5,629,784) describe a direct view liquid crystal display, wherein films are placed on the viewer-side of the liquid crystals, either interior or exterior to the front polarizer (i.e. analyzer). The film stack comprises a refracting film having facets, and thereafter an optional diffuser. The diffuser can have a rough surface facing the viewer, or can be of the holographic type.

Larson (U.S. Pat. No. 5,751,388) describes a front projection screen (FIG. 9 and Col. 13, lines 34–52) using a polarization sensitive scattering element (PSSE) to preferentially diffuse the polarized light from a projector, while absorbing ambient light of the opposite polarization.

Clabborn (U.S. Pat. No. 6,123,877) describes the fabrication of a symmetrical diffuser followed by stretching to provide asymmetrical viewing angles.

Chou et al. (U.S. Pat. No. 6,163,402) describe the use of a volume diffuser and a linear polarizer, whereby the diffuser passes a portion of light without changing the incident polarization, and substantially depolarizes incident light that is laterally scattered, which is subsequently absorbed in the polarizer, thereby minimizing loss of resolution. The volume diffuser is constructed from particles dispersed within a binder. A laminate is proposed having AR and anti-smudge coatings in the front, the diffuser towards the rear, and either a matte surface or AR coating on the surface where projected light is incident.

Allen et al. (U.S. Pat. No. 6,239,907) describe the construction of a rear projection screen by use of a dispersive birefringent element to independently control the amount of divergence in each axis.

Harada et al. (U.S. Pat. No. 6,381,068) describes the construction of a front projection screen utilizing a reflective polarizer element in combination with a diffusing element and/or a glare suppression element.

While the application of screens for projection applications are generally well understood, some background information is necessary to understand direct-view applications, where a collimated backlight and a front screen enables a liquid crystal display to have CRT-like viewing angle performance.

Direct-View LCDs Using Collimated Light and Front Screens

Fischer (U.S. Pat. No. 3,840,695) describes a liquid crystal display that utilizes a light scattering film or foil above the analyzer (i.e. closest to the viewer) enabling wide angles when used in combination with collimated backlight (e.g. 3M louver film and a fluorescent lamp).

Bigelow (U.S. Pat. No. 4,171,874) details an arrangement similar to Fischer, except a point source of light is used.

Zimmerman et al. (U.S. Pat. No. 5,481,385) and Abileah et al (U.S. Pat. No. 5,629,784 ca. 1997), both referenced previously, describe direct-view liquid crystal displays, employing a collimated backlight and a front screen. Yamaguchi (U.S. Pat. No. 6,421,103) describes the use of a collimating plate in a direct-view system. The specification also describes the nuances related to the desired degree of collimation for a given pixel-pitch.

For very high resolution direct view applications, such as a 10.4" diagonal LCD with XGA resolution (1024×768 color pixels), a high degree of collimation is required to avoid loss of resolution caused by the mixing of adjacent pixel information in the screen. Further, if the application requires high brightness and a degree of compactness, the concept of etendue must be carefully considered. Such was the case in U.S. Pat. No. 6,428,198. The '198 patent details a compact, high brightness system employing a point source, collection optics, fiber optics, a dimmer, homogenizer, more fiber optics, non-imaging "morphing" collimators, a turn-the-corner assembly feeding a waveguide that illuminates a liquid crystal display capped with a viewing screen. Etendue was carefully considered in the design in order to maintain high brightness in a compact assembly. U.S. Pat. No. 6,428, 198 is incorporated herein by reference.

In laboratory testing of a device in accordance with the '198 patent, it has been observed that existing screen technology (e.g. black-matrix beaded-screens and engineered surface-diffusers), was not suitable for use in this application, exhibiting one or more deleterious effects, such as high absorption, high ambient light reflectance, high retroreflectance, "noisy" imagery, etc. Some of these effects are described and characterized in "Image noise in high-resolution rear-projection screens", B. Larson, et al., Proc. SPIE Vol. 4712, p. 202–211, Cockpit Displays IX: Displays for Defense Applications; Darrel G. Hopper; Ed., August 2002.

It is with this experience that the need for an improved, manufacturable screen technology was realized.

BRIEF SUMMARY OF THE INVENTION

One embodiment of the present invention employs a volume diffuser in combination with several other components to provide a high resolution, low cost, high transmittance screen. The other combinations of components, collectively referred to herein as an "optical stack," act to, among other things, provide high ambient light rejection. The overall combination provides quality attributes desired in a viewing screen.

While the present invention has particular applicability and is described in at least one embodiment with respect to a transmissive liquid crystal display (LCD), those skilled in the art will appreciate that the invention may also be applied to reflective or transflective LCDs, as well as other imaging devices (e.g. MEMS-based projection system).

In a preferred embodiment, the present invention provides a viewing screen having high transmittance of polarized light from an LCD, while maintaining high ambient light rejection through the use of a polarizer, a volume diffuser, and optical coupling to eliminate fresnel reflections. It is noted that a significant aspect of the present invention is that the achieved high efficiency is a result of, at least in part, the use of a diffuser that exhibits minimal birefringence. Further, an antireflection means on the output surface is employed (e.g. thin film interference coating, motheye feature), specifically avoiding textured antiglare surface treatments, which only serve to worsen diffuse reflectance.

More specifically, for projection and direct-view information display applications, especially those employing the modulation of collimated, polarized light, an index-coupled laminated viewing screen is described, comprising a non-birefringent diffuser and a polarizer.

The non-birefringent diffuser receives information-coded, collimated, polarized light from the display, and increases the divergence to meet the viewing angle requirements of a given application. This light of greater divergence is further passed through a polarizer, which acts to reject ambient light in the viewer's environment. The non-birefringent properties of such a diffuser gives rise to high optical throughput, and excellent uniformity. In a preferred embodiment, the screen is index-coupled from input to output to reduce fresnel reflections, improving both throughput and ambient light rejection.

As will be discussed in the Detailed Description, one aspect of this invention relates to the use of diffusers that are essentially birefringence-free. Since this can be construed as a non-specific term, a definition will be provided based on references to prior art. Further, since many diffusers are polymer-based, the definitions have been tailored to the control of birefringent effects with the materials and manufacturing processes of optical polymers.

Prest (U.S. Pat. No. 4,373,065) describes some of the basic concepts related to birefringence: (Col 1, lines 23–29) Birefringence of the sample is determined by finding the indices of refraction of the sample for polarized light in one direction and that for polarized light in a direction perpendicular to the first direction. The differences in the two indices of refraction is the birefringence of the sample material.

(Col. 1 lines 34–40) "Moreover, even when a polymeric material has zero birefringence in its bulk state, the processing of such a material into a device, such as by extrusion or injection molding, would place stress on the material in the direction of flow. Such mechanical stress would induce orientation of the polymer molecules which almost always results in induced birefringence."

Caruso et al. (U.S. Pat. No. 6,248,859) describes the birefringence issue within polymers as follows (Col. 2, line 50–61): ". . . birefringence in an article molded from a polymeric material is related to orientation and deformation of its constituent polymer chains. Birefringence has several sources, including the structure and physical properties of the polymer material, the degree of molecular orientation in the polymer material and thermal stresses in the processed polymer material. For example, the birefringence of a molded optical article is determined, in part, by the molecular structure of its constituent polymer and the processing conditions, such as the forces applied during mold filling and cooling, used in its fabrication which can create thermal stresses and orientation of the polymer chains."

Koike (U.S. Pat. No. 6,201,045) defines non-birefringence (Col. 1, lines 14–17) as "material showing no substantial birefringence or showing only the birefringence to such an extent as giving no effect in view of practical use". This definition will be adopted herein and either referenced as non-birefringence or no-birefringence.

Koike also provides a well-organized dissertation on the methods used to achieve non-birefringence in optical resins comprising unique polymer blends and the following processing approaches (Col. 3 lines 34–39) "A method of molding so as not to cause orientation in the polymer; which is a method adopted based on experience and for eliminating orientation upon molding, for example, by using casting, conducting extrusion molding at a greatly lowered extruding speed or further using biaxial stretching."

Chou et al. (U.S. Pat. No. 6,163,402), which discloses related technology, described the following at Col. 8, lines 13–35: ". . . For a given formulation, there exists a minimum thickness, referred to herein as a threshold thickness, above which the diffuser displays no color and negligible or no speckle for a given imaging system. When a diffuser is made thick enough to substantially reduce color and speckle, however, the amount of lateral scattering present in such a diffuser can significantly degrade the diffuser resolution (modulation depth).

". . . In accordance with one aspect of the present invention, the constraint on lateral scattering is relaxed by using a diffuser in which the laterally scattered light is preferentially depolarized and absorbed by the polarizing element of the screen assembly. Relaxing this constraint allows a thicker diffuser to be used. Accordingly, a screen that has a high resolution (MD) can be constructed which also has low color and speckle. By purposefully allowing a significant portion of depolarizing lateral scattering, it is easier to select a formulation at least as thick as the threshold thickness. When the diffusing element, which otherwise substantially preserves polarization of the diffused light, is combined with an absorbing polarizer, it can be used as a rear projection screen to display a high-resolution, artifact-free projected polarized image."

As can be understood, the '402 patent addresses the issue of reducing speckle by increasing the diffusion of the screen, while limiting the resultant degradation in resolution by absorbing lateral scattering. It is believed that this method of speckle-reduction results in unfavorable losses in efficiency, when speckle-reduction can be addressed in other ways; e.g. within the light source (U.S. Pat. No. 6,445,487), perturbating a light path within the projector (U.S. Pat. No. 3,262,359, U.S. Pat. No. 4,035,068, U.S. Pat. No. 4,155,630), perturbating the position of a fold mirror (U.S. Pat. No. 6,317,169) or the screen itself (U.S. Pat. No. 5,272,473) or even via a specially-recorded (polarization preserving) holographic screen (U.S. Pat. No. 6,268,941).

Alternatively, it is known that increasing the divergence angle out of an exit pupil can reduce speckle as described in *Rear Projection Screens for Light Valve Projection Systems*, J. Goldenberg et al., SPIE Vol. 3013, February 1997, pgs 49–59). FIG. 3 of Goldenberg et al. suggests that to achieve a speckle contrast of <6 (said to be the objectionable threshold) the angular subtense of the exit pupil, $\theta'$, should be no less than 0.75 degrees (half-angle). Per equation (4) therein, the product of magnification and f/# then needs to be less than 38.2. Assuming an f/2 design can be achieved, then a maximum magnification of 19.1 is advised. Assuming a 1.4" diagonal microdisplay, a maximum projected image of 26.7" would be recommended, perhaps suitable for a high resolution desktop monitor. For larger images requiring high resolution, a tiled-array of f/2 projectors, for example, might be applicable. Such systems are known in the prior art. For larger images without resorting to tiling, one option would be to use a larger imaging device.

In summary, there exists outside of Chou et al., many techniques for reducing speckle without sacrificing screen efficiency. The object of the present invention is to provide, in combination, a high efficiency, high resolution, high ambient-light-rejecting screen.

Through testing of diffusers & screens from several manufacturers, it was found that a backlight diffuser from Astra Products (Baldwin, N.Y.) called Clarex DR-IIIC Light Diffusion Filter, has characteristics that are consistent with the principles of the preferred embodiment of the present invention. Note that Clarex is a registered trademark of Nitto Jushi Kogyo Co. Ltd. (Tokyo, Japan).

BRIEF DESCRIPTION OF THE DRAWINGS

FIG. 11 shows a screen transmittance measurement test setup and data derived in connection with the present invention.

FIG. 12 shows a first order screen transmittance model used in accordance with the present invention.

FIG. 13 shows a mathematical model and data related to high ambient contrast calculations.

DETAILED DESCRIPTION OF THE INVENTION

Figure 1:
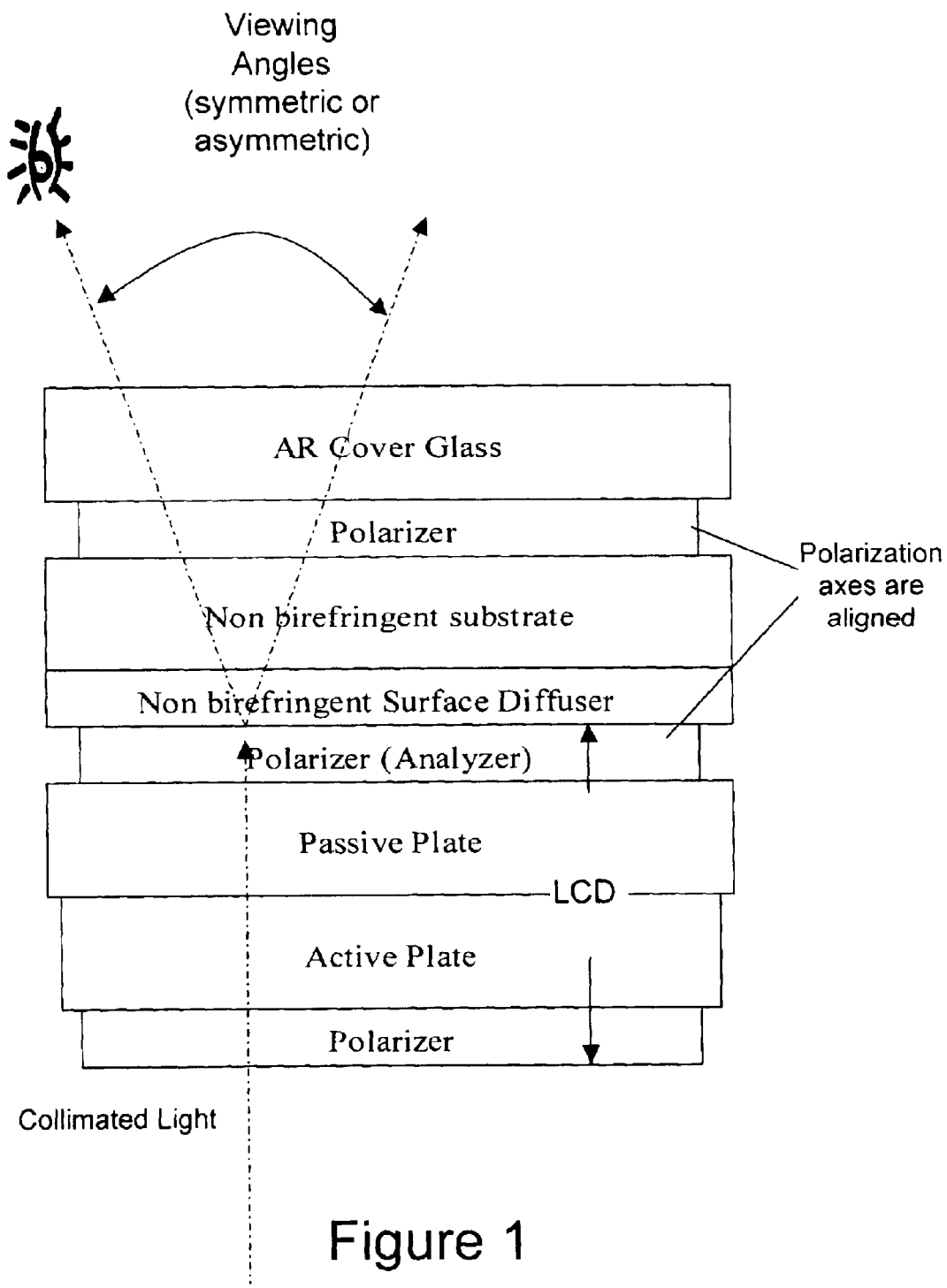
FIG. 1 is a schematic diagram of a screen employing a non-birefringent surface diffuser for a direct-view application in accordance with the present invention.

One embodiment of the present invention, shown in FIG. 1, was realized using a surface diffuser, like that described in U.S. Pat. Nos. 6,010,747 and 6,261,664, and manufactured by Wavefront Technology (Paramount, Calif.).

Figure 2:
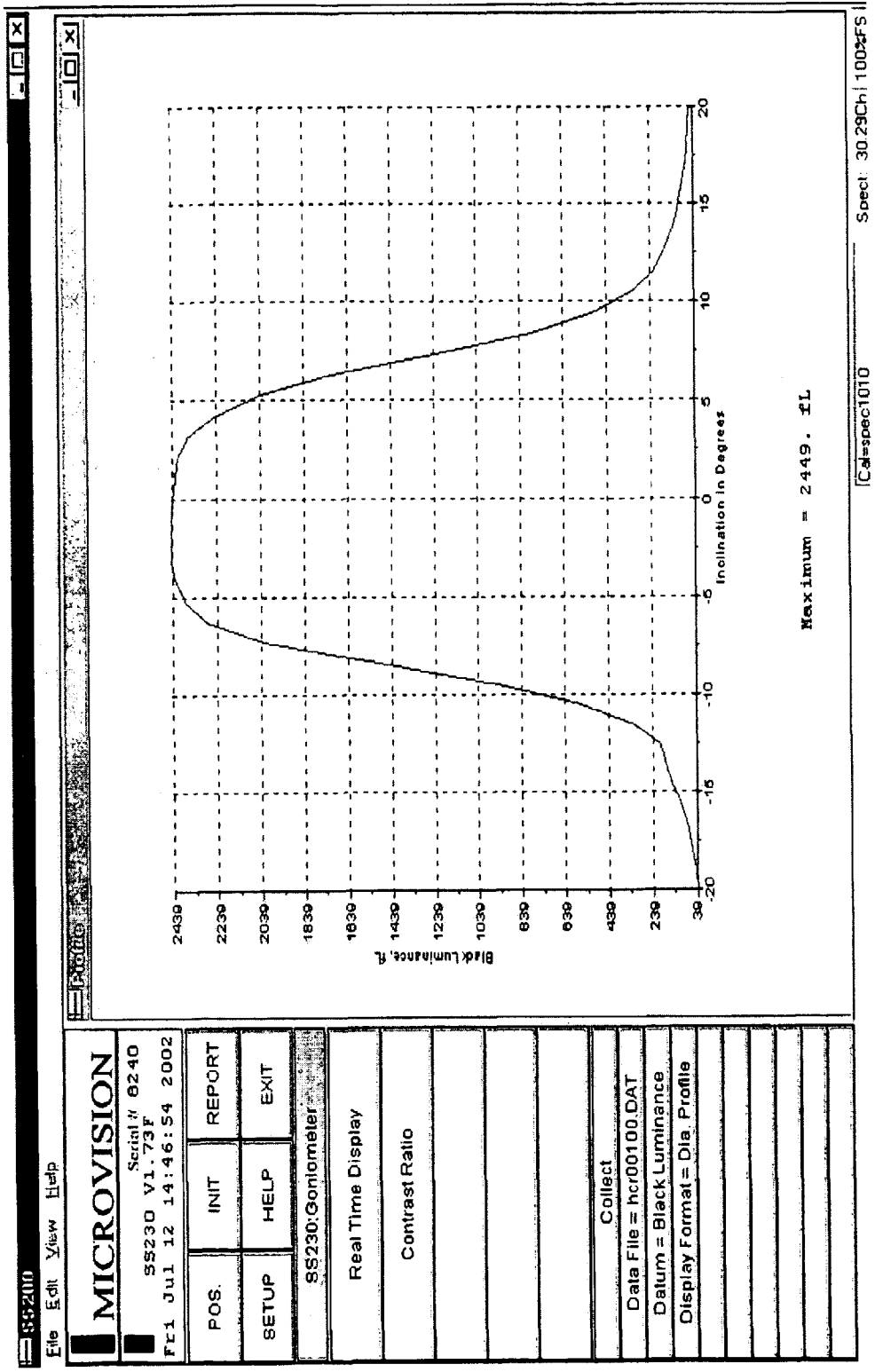
FIG. 2 is the measured collimation of backlight used with a 10.4" diagonal XGA resolution AMLCD.

When used as a direct view screen as shown in FIG. 1 (without the polarizer and AR cover glass), the results were unimpressive in terms of luminance and contrast in ambient lighting. The test setup included the 10.4" XGA resolution LCD in combination with the collimation structure shown in FIGS. 9 & 13 of U.S. Pat. No. 6,428,198, referenced earlier. The fibers used are ESKA 1.5 mm diameter, and the light source was a commercial off the shelf Wavien fiber optic illuminator. The resultant collimation incident on the LCD is shown in FIG. 2. A subsequent review of the diffuser using a Fourier scope revealed significant birefringence, thought to be mainly due to the film substrate. When the same diffuser was cast on a low birefringence substrate (cast acrylic), the luminance improvement was significant.

The benefit in using this type of diffuser technology is that the diffusion angles can be changed as taught in the '747 and '664 patents. Further, this type of diffuser employs random structures much smaller than the LCD's pixels, enabling high resolution imaging without moire. The downside is that the textured surface, much like that of a surface hologram, requires an air gap, and thus fresnel reflections cause enough backscatter to limit its use in high ambient lighting conditions. While such a surface can be treated with an AR coating, the texture requires the coating design to cover all incidence angles, and such a design is not practical. The diffuser was then evaluated with an absorbing coating deposited on the textured surface applied by CP Films (Canoga Park, Calif.). An absorbing coating would not have the angular sensitivity of an interference coating. The approach is based on the concept that collimated, information-coded light would pass through a single diffusing feature, whereas the non-collimated ambient light would pass through a plurality of features, striking a significantly greater number of absorbing sites, improving ambient contrast, owing to the greater absorption of ambient light over information-coded light. The resultant film was measured by a Shimadzu UV-3101PC scanning spectrophotometer, registering 85% transmittance and 0.2% reflectance on the matte side and less than 7% reflectance on the clear (backside). The optical density of the absorption coating varies the balance between transmission and reflectance of the film. Note that the absorbing feature can also be integrated within the bulk material of the surface diffuser, or dyed into a depth of the topographic features, or some combination thereof.

Figure 6:
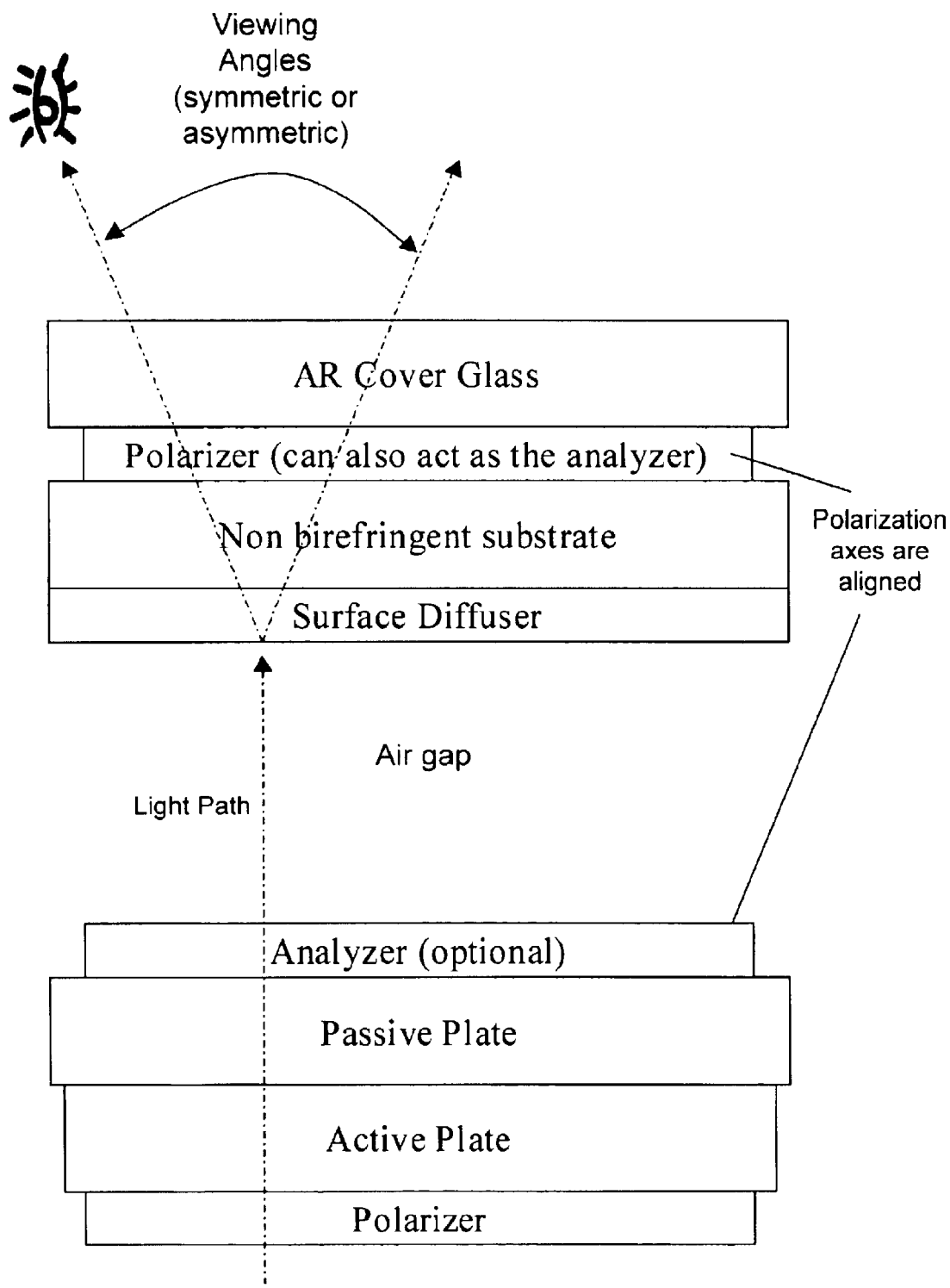
FIGS. 6–8 are schematic diagrams of a screens employing a surface diffuser along with an intervening air gap in accordance with the present invention.
Figure 7:
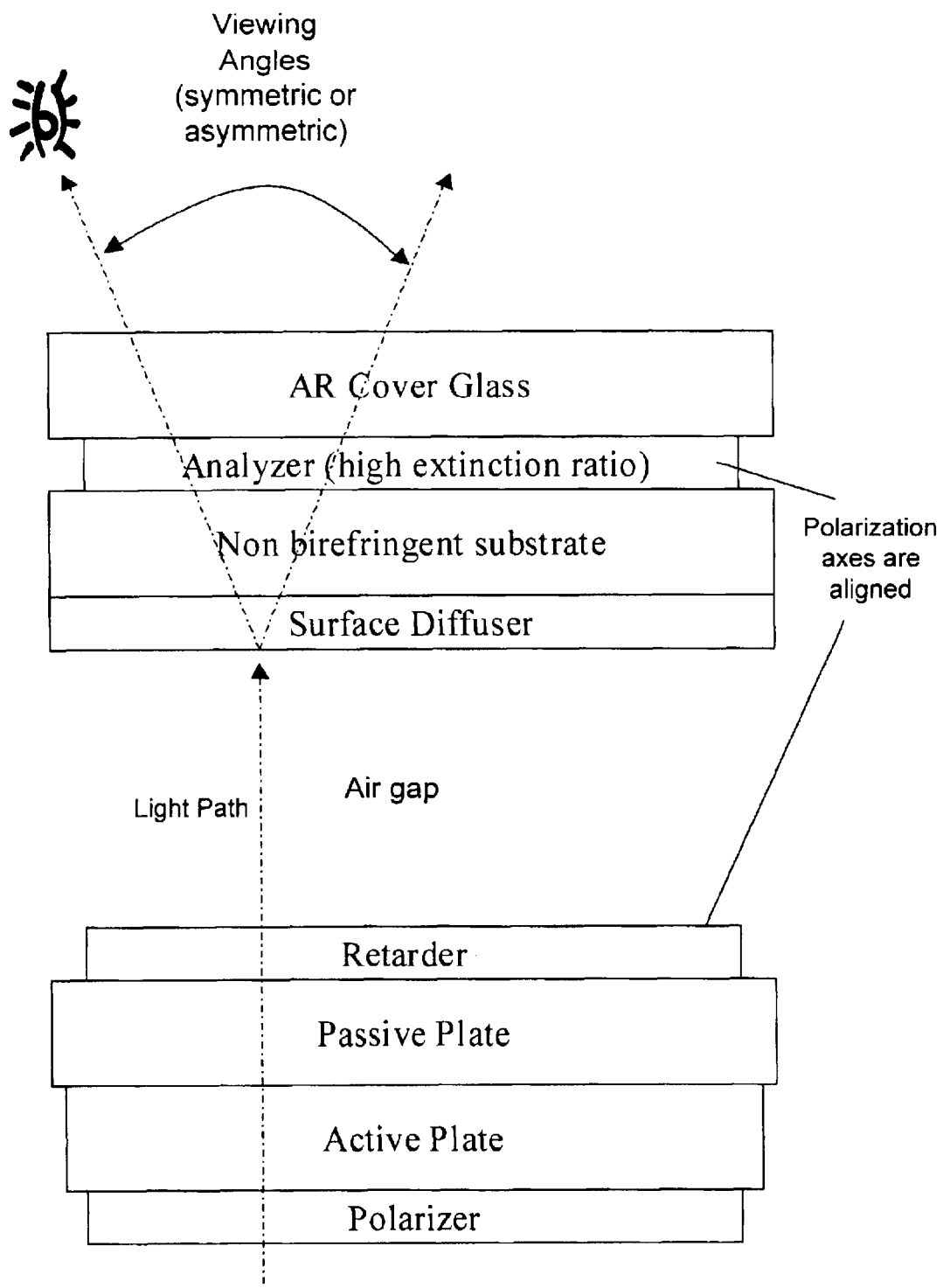
Figure 8:
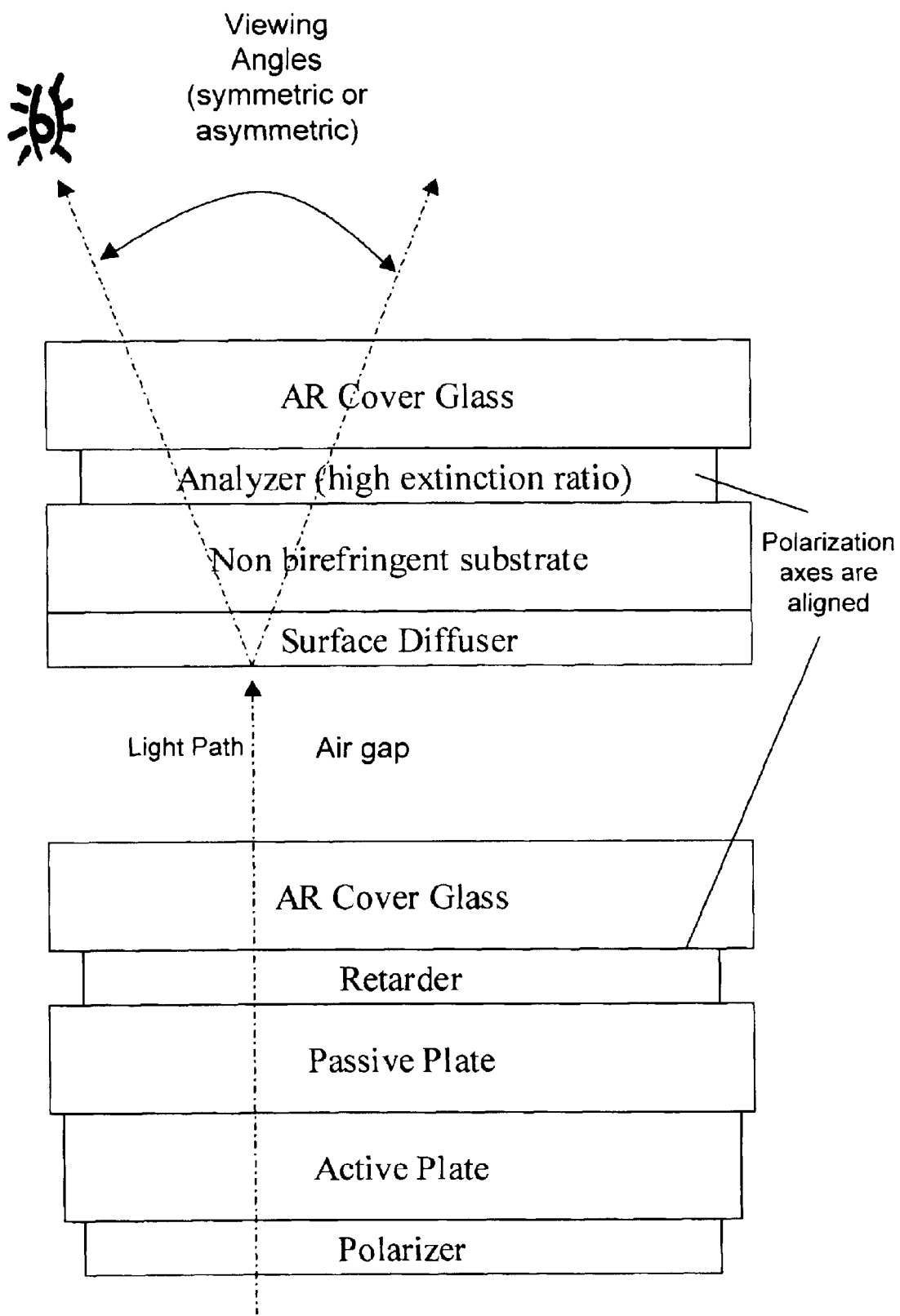

As shown in FIGS. 6, 7, and 8, the addition of index coupling to a polarizer and an AR cover glass further improves ambient contrast. Additionally, a Design of Experiments (DOE) can be employed to optimize the optical density of the absorptive coating to meet the desired balance of reflectance versus transmittance.

Note that in all cases the surface diffuser was positioned furthest away from the viewer to avoid the impact of fresnel reflections from ambient light, and in the case of direct-view applications, it was necessary to position the diffuser against the LCD to avoid loss in resolution (as discussed in Yamaguchi). Also note that holographic surface diffusers can be treated with the absorptive coating in the same fashion as described above. Such diffusers are available from Physical Optics Corporation (Torrance, Calif.), and it was confirmed that "the holographic surface structure does not affect polarization.

To avoid the absorptive coating on a surface diffuser, a volume diffuser that could be index-coupled on both sides was contemplated. Such a diffuser preferably comprises the following minimal feature set:

High efficiency ambient light rejection, requiring a non-birefringent diffuser with low-backscatter from the bulk diffusion mechanism;

High resolution, requiring a thin substrate that could provide reasonable diffusion angles; and Highly cost effective, requiring an easily-manufactureable design.

Perhaps the most popular high-resolution ambient-light-rejecting projection screens are commercially available from Jenmar Visual Systems (Fremont, Calif.) and use spherical particles dispersed in a black binder; however, these screens are known to have low transmittance (~50%) and a "noisy" or a grainy-like image rendition.

Other high resolution projection screens were tried, but the Jenmar screens had the best combination of the previously-mentioned desirable attributes.

Figure 3:
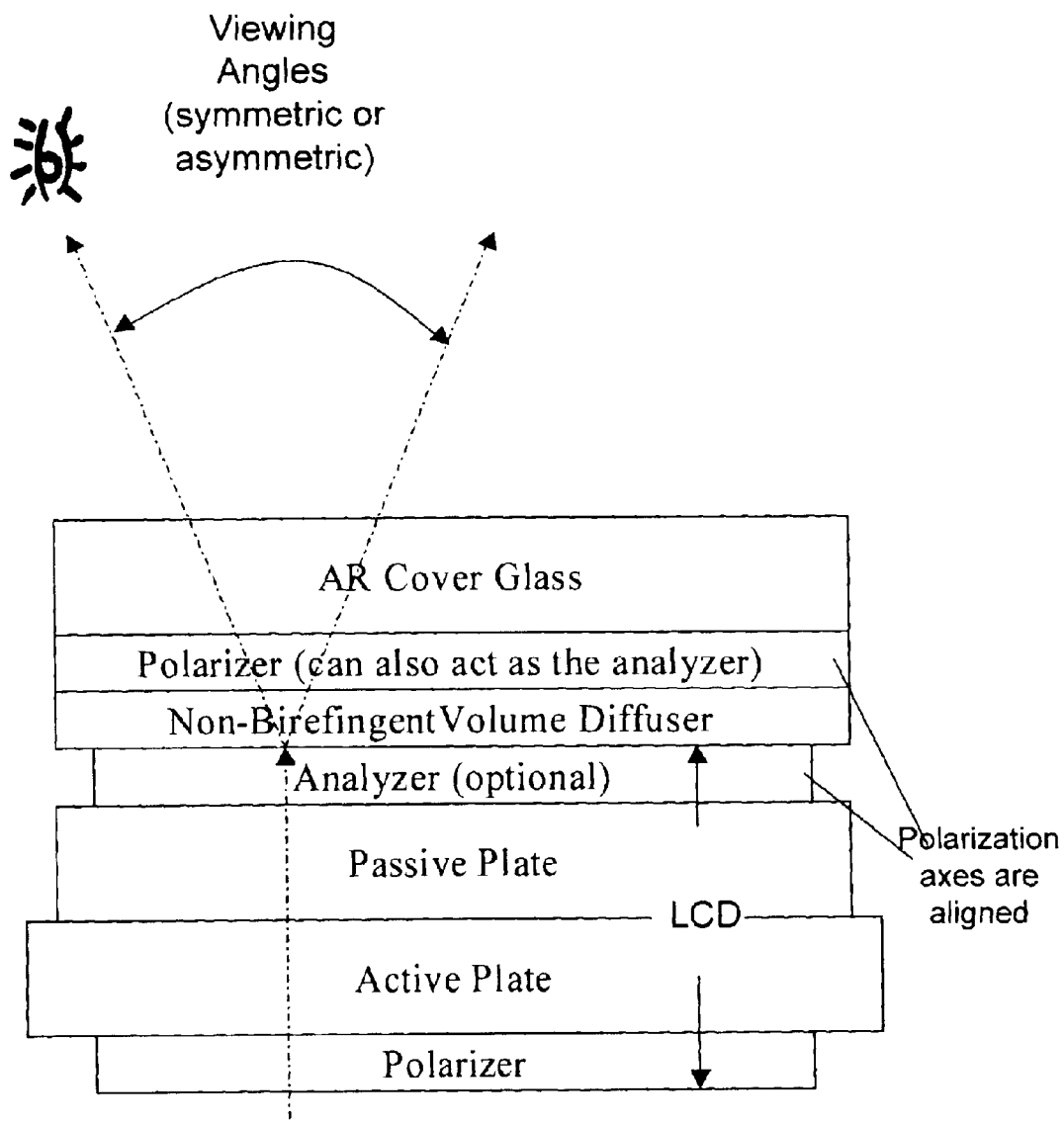
FIG. 3 is a schematic diagram of a screen employing a non-birefringent volume diffuser for a direct-view application in accordance with the present invention.

It was thereafter discovered that a diffuser used for homogenizing fluorescent backlights fits all the basic criteria. As previously discussed, polymers made with a casting method have the potential to exhibit low birefringence. It is believed that the CLAREX DR-IIIC diffusers, sold for backlight diffusion, are made using a casting process. Various samples were tried, and the DR-85C with 0.3 mm thickness appeared to work quite well in the test setup as described earlier, and laminated in the structure as shown in FIG. 3. Significant improvement of the diffuser/polarizer/AR-glass laminate was observed when it was index coupled to the LCD—the LCD's off-state became markedly blacker in ambient lighting.

Various other diffusers & screens were tried, and the LuminOz (Culver City, Calif.) Nimbus screen showed high gain and only mild birefringence. Using the same test conditions, the Clarex screen measured ~90 fL head-on, while the Nimbus screen measured ~700 fL. Of course, the Clarex was distributing the light over a much larger solid angle.

Figure 5:
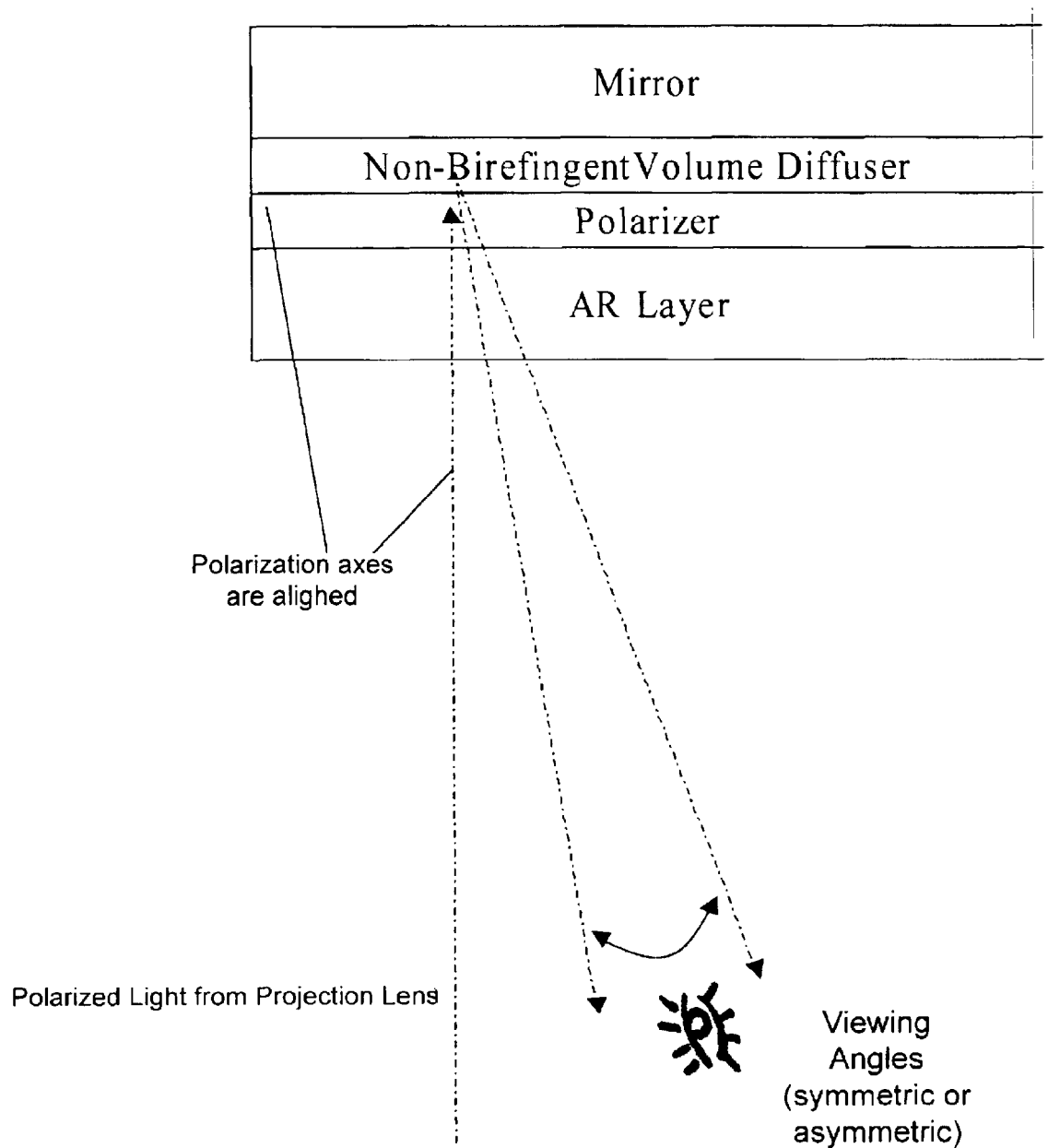
FIG. 5 is a schematic diagram of a screen employing a non-birefringent volume diffuser for front projection application in accordance with the present invention.
Figure 21:
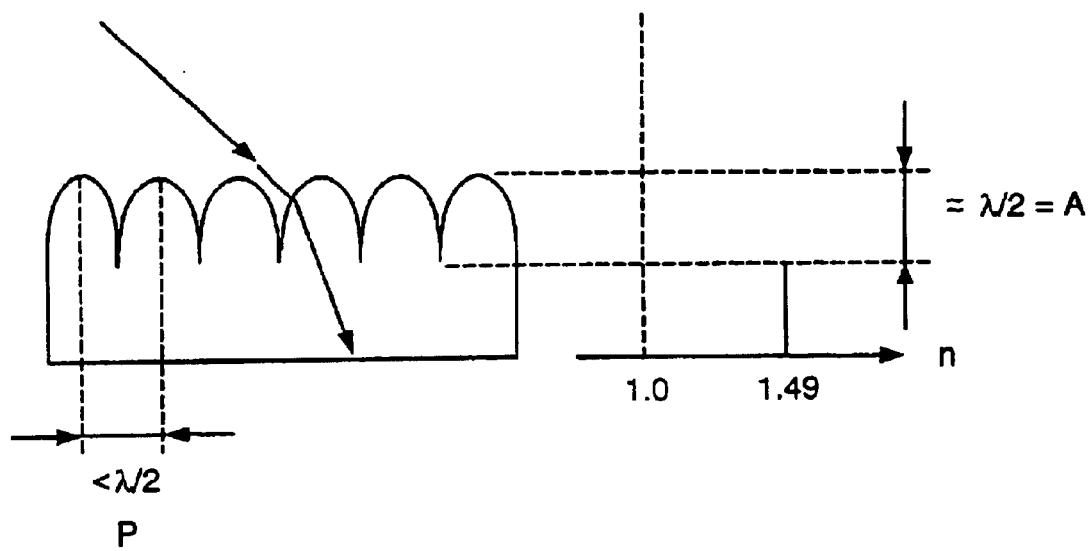
FIG. 21 shows a Motheye pattern used in accordance with the present invention.

It has also been found that a significant improvement in ambient readability is derived from proper refractive-index matching (also referred to as "optical coupling" or simply "coupling"). As known in the art, suitable coupling approaches (and suppliers for the necessary materials) include: (1) inserting a gel (Nye Optical, Fairhaven, Mass.) or adhesive (Norland Products, Inc., Cranbury, N.J.) between two substrates, (2) coating a substrate surface with a thin film deposition; e.g., antireflection coating if the substrate is in contact with air (Optical Coating Laboratory, Inc., Santa Rosa, Calif.), and (3) modifying a substrate surface with a motheyc (FIG. 21) or other suitable nanostructure (Reflexite, Avon, Conn.). Especially noticeable was the reduction in diffuse reflectance, which is counterintuitive, since index-matching is generally associated with a reduction in specular reflection. For example, Chou, et al., Col. 12, lines 39–48 highlights the benefit only in specular reflection:

"In each of the embodiments illustrated in FIGS. 5 and 6, it may be desirable that the surface onto which an image is projected be treated to reduce specular surface reflections. In one embodiment, the rear surface of the diffuser 501 (FIG. 5) or diffuser substrate 602 (FIG. 6) has been treated to have a matte texture. The matte surface tends to reduce specular reflection. In one embodiment, an AR coating may be applied to the surface as an alternative or additional way to reduce specular reflections of the image projected onto the screen assembly."

In the present invention, the ambient light (from both direct and indirect sources), after passing through the polarizer, strikes the proximal face of the diffuser, is further redirected through the bulk of the diffuser, and then strikes the distal face of the diffuser. If the distal face is not index-coupled to its adjacent component, then the Fresnel reflection will send ~4% of the ambient light back through the diffuser, the polarizer and to the viewer. Since the diffuser preserves the polarization state, much of the 4% Fresnel reflection gets back through the polarizer, causing a loss in high ambient contrast. Therefore, in order to achieve high ambient light rejection, the diffuser is preferably index-coupled (e.g. AR-coated in the case of a rear projection screen) at both faces.

The diffusion feature within the optical stack must be kept below a maximum thickness (dependent upon the diffusion technology) to avoid a significant loss of resolution (e.g. U.S. Pat. No. 3,712,707, Col. 5, lines 37–43 discusses a 40 mil maximum for the diffusion feature described therein). As mentioned previously, a 0.3 mm (11.8 mil) DR-85C diffuser was used in the testing described herein. For direct view applications, the distance between the screen and the liquid crystal layer is preferably minimized (e.g., laminated to the analyzer), and the collimation is sufficient to minimize the information from one pixel mixing with the adjacent pixels (e.g. as discussed in Yamaguchi).

It should be stated that for projection applications, such a screen is most suited for projectors that employ the same linear polarization for all colors. One such example is described in "Scrolling Color LCOS for HDTV Rear Projection", J. A. Shimizu, SID 2001 Digest, pgs 1072–1075.

Figure 4:
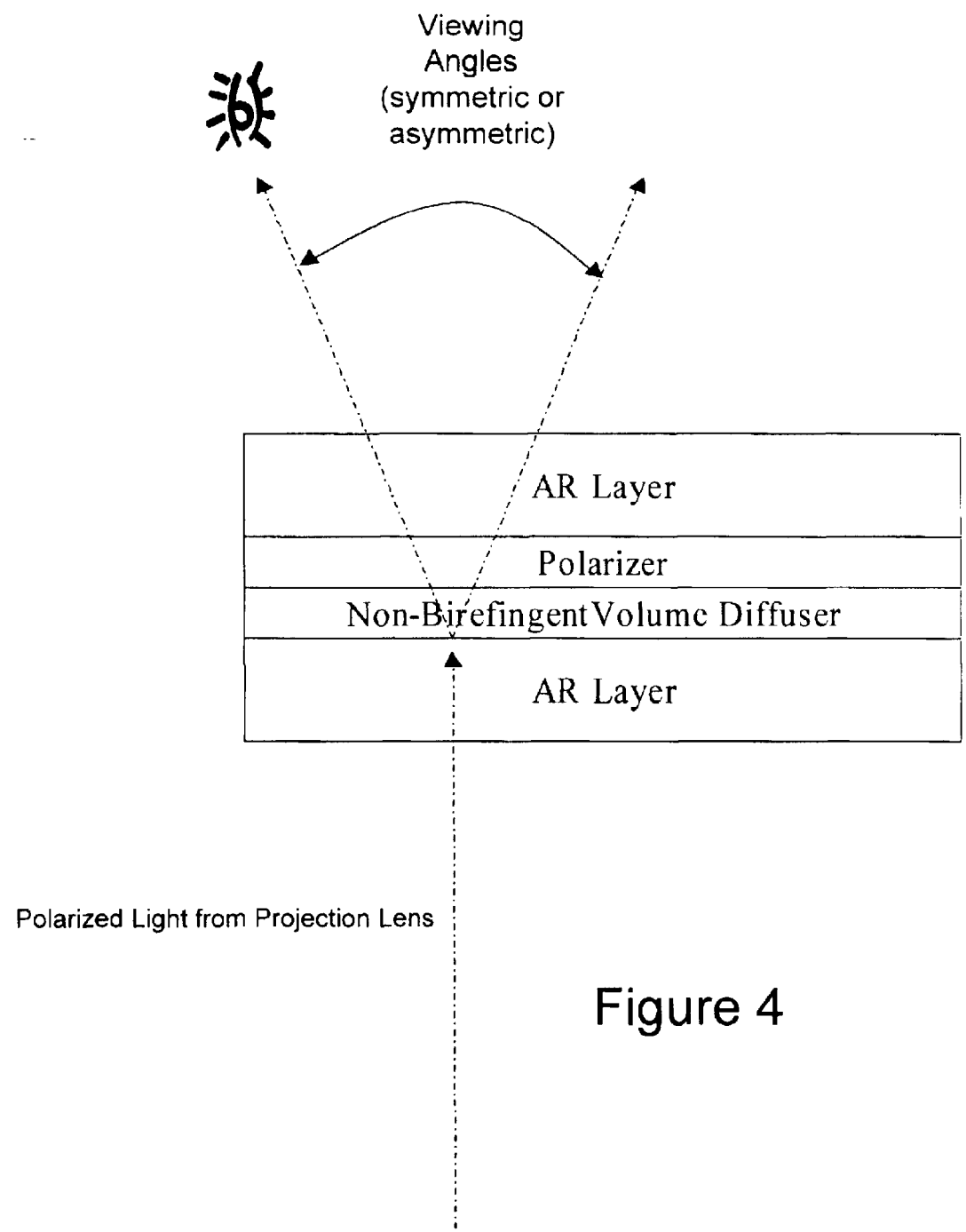
FIG. 4 is a schematic diagram of a screen employing a non-birefringent volume diffuser for rear projection application in accordance with the present invention.

FIGS. 4 & 5 depict other embodiments of the present invention. FIG. 4 shows the use of a volume diffuser in connection with an optical stack used for a rear projection screen. FIG. 5 shows an optical stack in accordance with the present invention that can be employed in a front projection screen application. Note that since the light makes two passes through the diffusing feature, its thickness is necessarily less than a rear-projection configuration, all other things being equal.

It is theorized that the CLAREX screens can be deformed in order to provide some degree of diffusion asymmetry as discussed in Land, U.S. Pat. No. 2,287,556, entitled "Translucent Screen", whose contents are incorporated herein. A further annealing process may be necessary to relieve the stresses that induce birefringence, but the temperature/time profile preferably is such that the material is not permitted to revert back into its initial state. As a further method of adding asymmetry, a beam-tilting film can be inserted into the optical path after the light exits the imaging device. Preferably, such a film would use volume features (e.g. gradient index) rather than surface features for the same reasons as discussed previously.

Another screen technology that may well fit all the desired criteria is volume holographic technology, which offers both low birefringence, and well-controlled diffusion angles. Information about this type of technology can be found in U.S. Pat. No. 6,421,148, which is incorporated herein by reference.

It is further contemplated that the availability of non-birefringent electro-optical diffusers or MEMS-based shutters can be used in connection with the several embodiments of this invention. For example, the diffuser and image generation system would be pulse width modulated to be active at the same time, such that during the off periods, the diffuser acts to enhance the ambient light absorbance. Similarly, a blackened MEMS shutter could be used to absorb ambient light during the off periods. Both frame-sequential and color-sequential operation are contemplated. Design considerations regarding temporal image formation are taught in U.S. Pat. No. 6,388,661, Monochrome and color digital display systems and methods", whose contents are incorporated herein to the extent that no conflicts exit.

Retroreflectance

U.S. Pat. No. 6,060,157 shows how retroreflection-like effects can occur via total internal reflection when ambient light passes through a transparent beaded substrate. This effect was witnessed by the present inventors when a collection of beaded- and non-beaded-screens were illuminated with a sun-gun. The beaded screens showed a strong retroreflection back towards the viewer along the line-of-site, a particularly undesirable effect. A screen in accordance with the present invention, on the other hand, does not show such undesirable retroreflection effects.

Back-Surface Scatter

In Chou (U.S. Pat. No. 6,163,402) there is no discussion as to how to reduce the diffuse reflection for improved ambient light rejection, only an emphasis to reduce specular reflections (col. 12, lines 44–48):

"In each of the embodiments illustrated in FIGS. 5 and 6, it may be desirable that the surface onto which an image is projected be treated to reduce specular surface reflections. In one embodiment, the rear surface of the diffuser 501 (FIG. 5) or diffuser substrate 602 (FIG. 6) has been treated to have a matte texture. The matte surface tends to reduce specular reflection. In one embodiment, an AR coating may be applied to the surface as an alternative or additional way to reduce specular reflections of the image projected onto the screen assembly."

In U.S. Pat. No. 4,153,654, Col. 3, lines 1–6, the net effect of a matte surface is described:

"Furthermore, while polymeric articles may be provided with a rough or matt surface to reduce specular reflection, such articles do not reduce the total reflection, i.e., in matt finished articles the reduction in specular reflection is obtained at the expense of an increase in the diffuse reflection i.e. scattering."

A surprising result in the present invention was discovered when the diffuse reflectance of the Clarex volume diffuser was measured to 19.1%, and when two AR-coated glass substrates were index-matched to either side of the diffuser, the diffuse reflectance was reduced to 9.2%. Only some of this is attributable to reductions in the ~8% fresnel surface reflections, and therefore the remaining backscatter component has been attributed to surface effects. Therefore, in accordance with the present invention, it is desirable to eliminate such effects physically, via manufacturing of smooth surfaces or optically coupling to a smooth substrate.

Figure 9:
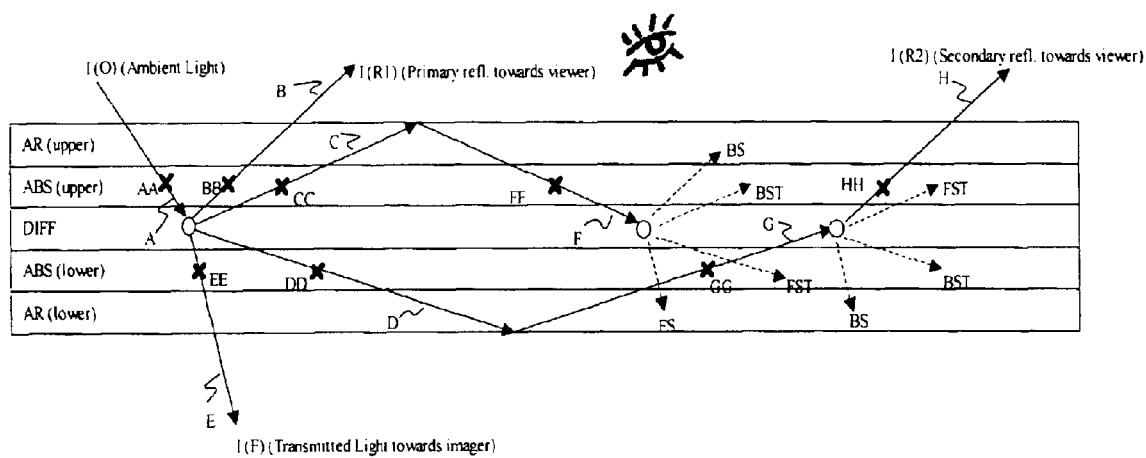
FIG. 9 shows a first order reflection model used in accordance with the present invention.

FIG. 9 depicts a model that describes a portion of the backscatter that is created from total internal reflection (TIR) off the inventive screen's back-surface. It can be shown that TIR comprises an angle-dependent phase shift (see, e.g., Fundamentals of Photonics, B. E. A. Saleh and M. C. Teich, Wiley Series in Pure and Applied Optics, J. W. Goodman, Editor, p. 208), and it can be further shown that by adding a second polarizer, the diffuse reflectance can be reduced by a factor of 1.6 with only a 20% penalty in the screen transmission efficiency. In view of TIR characteristics, it is also contemplated, in accordance with the present invention, to provide a complementary phase-shift coating on the back surface of the screen to even further reduce this backscatter component.

In Abileah (U.S. Pat. No. 5,629,784), an air-spaced micro-structured film is used to reduce diffuse reflection (col. 10, lines 41–47):

"It is also believed that BEF 17 substantially collimates ambient light (e.g. sunlight) hitting the front panel of the display, thereby directing the ambient light directly into the panel. This substantial collimation of ambient light going into the panel substantially reduces the specular and diffused ambient reflection percentage of the display panels of the various embodiments of this invention."

In certain embodiments of the present invention, in contrast, it is preferable that no air gaps are permitted.

Abileah also discusses the use of an AR coating on a roughened surface to reduce diffuse reflection (col. 14, lines 16–27).

"The provision of anti-reflective film or coating 35 on the exterior roughened surface of diffuser 21 decreases the ambient light reflection of the display panel, preferably with respect to both specular and diffused reflections. AR coating 35 may have a topography similar to that of light scattering or roughened outer surface 33 of diffuser 21 so as to not hinder the light spreading characteristics of diffuser 21, or alternatively, may be provided on a separate glass substrate exterior diffuser 21 as shown in FIG. 1(a). As will be understood by those of skill in the art, such AR coatings may be provided in any of the different embodiments of this invention."

Further in contrast to Abileah, the present invention provides a screen wherein exposed surfaces of topographic form are preferably not be permitted.

Abileah also discusses very low diffuse & specular measurements by using air gaps (col. 27, lines 30–55):

"EXAMPLE 8

FIG. 3 shows the cross sectional view of the AMLCD of this Example in that BEF 90/50 17 from 3M and diffuser 21 were disposed interior front polarizer 15, with facets 19 of BEF 17 facing LC layer 9 and roughened surface 33 of holographic diffuser 21 facing the viewer and abutting the interior surface of polarizer 15. Diffuser 21 was the same 100°/30° holographic from POC as previously mentioned. Conventional HEA anti-reflective coating obtained from OCLI, Santa Rosa, Calif., was disposed on the exterior surface of a separate glass sheet, the sheet being adhered to the exterior surface of polarizer 15 via a conventional optical adhesive. Facets 19 of BEF 17 and the ±50° diffuser axis were aligned horizontally substantially in parallel with one another. The specular and diffused reflections of this AMLCD were tested and turned out to be: specular 30°, about 1.9%; and diffused 30°, about 0.9%. These ambient reflection results were excellent yet unexpected.

It is noted that this Example differs from the previous Examples in that polarizer 15 was detached from the panel so that BEF 17 and diffuser 21 could be placed interior thereof. The index matching oil, of course, was disposed adjacent both sides of BEF 17, but no oil was placed between polarizer 15 and diffuser 21."

Figure 10:
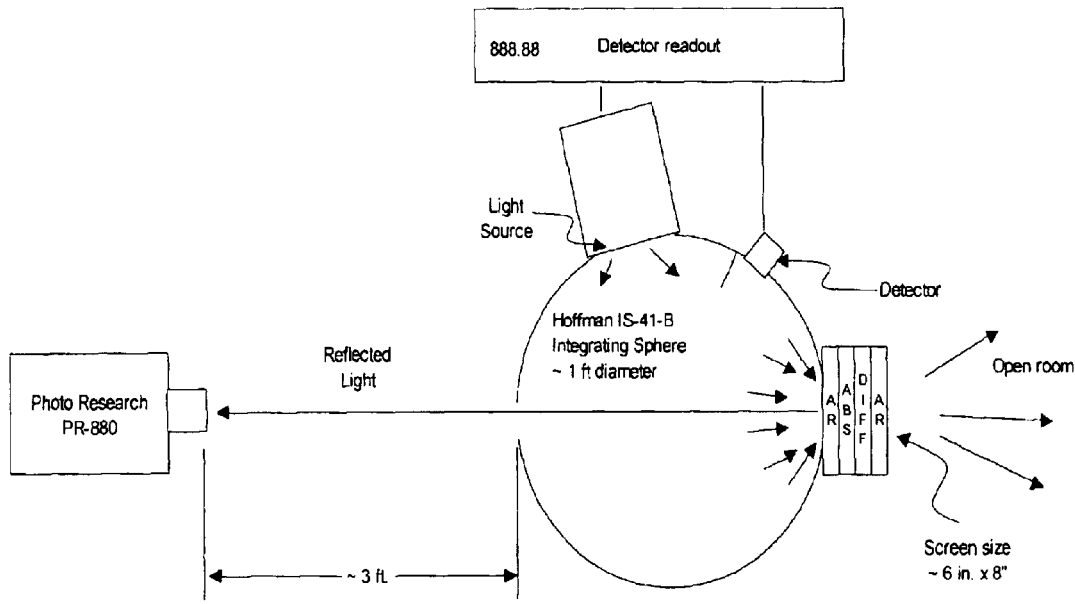
FIG. 10 shows a test setup used and data derived in connection with the present invention.

The diffuse reflection measurements on the volume-diffuser based screens of the present invention were performed in a more severe environment. As shown in FIG. 10 the screen under test is illuminated by diffuse light from an integrating sphere, and the photometer 160 measures normal to the screen, emulating what a human eye would sense in a diffuse environment (albeit without retoreflectance effects). In Abileah, the source is collimated and positioned normal to the screen, while the photometer is positioned at 30 degrees from normal (see FIG. 24 of Abileah). It is unknown whether the backscatter from the simulated sunlight source was consistently low across all angles, since one would think that the retroreflection from air-spaced BEF film should have been significant, especially in combination with the air-spaced holographic surface diffuser. To understand this further, reference can be made to FIG. 8 of Abeliah U.S. Pat. No. 5,161,041. Note that the rays from the lamp that strike the prismatic structure close to the flat-surface's-normal are retroreflected, while those striking off-normal pass through the film. In addition, in Abileah '784 the air-spaced holographic surface diffuser will have high diffuse reflectance owing to its textured surface. Accordingly, it is believed that if the diffuse measurement were made using a setup consistent with that shown in the instant FIG. 10, Abileah's diffuse reflectance measurements would likely be higher.

Samples of various embodiments of the present invention were fabricated, and measurements were made between these samples and commercially available and most popular high-resolution ambient-light-rejecting screens beaded screens (from e.g., Jenmar and 3M). It is noted that the beaded screens did not employ a polarizer as in Chou (U.S. Pat. No. 6,163,402), but are understood to have microspheres embedded in a black matrix. Testing results show the present invention demonstrated marked improvements in performance compared to the well-known beaded screens.

Referring again to FIG. 9, a first-order qualitative reflection model was constructed to understand the measurements. The diffuser was simply modeled having three volume diffusing features: leftmost, middle, rightmost. Also, because of the index matching employed (AR coated cover plates, and adhesive between layers), the fresnel reflections between layers were considered to be insignificant.

Ambient light is first filtered by an absorbing element (e.g. polarizer, triple-notch filter or the like), and then strikes the leftmost feature. This energy is then distributed into four regions—a high-angle back-scatter component (B), a shallow-angle back-scatter component (C), a shallow-angle front-scatter component (D), and a high-angle front scatter component (E). In each region, the scattered component first passes through a polarizer before striking the upper or lower air-interfaces. The low-angle scattered components will reflect off the air-bounded surfaces via total internal reflection (TIR), while the high-angle scattered components exceed the TIR angles and are able to exit the screen. The upper and lower TIR components (F and G respectively) then have a second pass through the absorbers and strike the middle and rightmost scattering sites respectively. Finally, the re-scattered components split into the four types of regions as discussed above. The significant re-scattered component in the reflection model is shown as H, which like B would reach the viewer's eye, degrading the ambient contrast of the display. It is assumed that after the second scattering sites, the energy left in the light rays have diminished significantly due to the absorption elements.

Several screen samples were then measured using the setup shown in FIG. 11. Both a photometer and an illuminance meter were used on an unlaminated 0.3 mm thick DR85C diffuser, a 0.3 mm thick DR85C diffuser with front & rear index-matched AR glass substrates, and without any diffuser structure. As shown, the samples were placed between parallel and crossed linear polarizers. The discrimination ratios (measurement through parallel polarizers divided by measurement through crossed polarizers) show that the diffuser does not significantly distort the incident polarization. Note that the ratios are higher when measured with the photometer since its acceptance angle is much lower than the illumination meter. This is clearly evident in the measurements made with "No Diffuser". In reality, the screen will be used in an application having a defined range of viewing angles (i.e. a viewing zone). The existing diffuser demonstrated a discrimination ratio of 5.4 within the larger solid angle captured by the illumination meter. To qualify a diffuser for use in this invention, a discrimination ratio of at least 2:1 throughout the viewing zone would ensure a reasonable transmittance as information coded light passes through the optical stack. This is a particularly desirable feature in selecting a diffuser for a high-efficiency screen, especially when the information display transmits or reflects polarized light. Note that if the absorption element were a triple-notch filter, then one would choose a diffuser that had minimal absorption in the pass bands.

FIG. 12 depicts a first-order qualitative transmittance model that was used to understand the net efficiency of the screens.

In constructing the models illustrated in FIGS. 9 and 12, as referenced previously, one needs to consider the phase relationship of the scattered light that TIR's off the upper and lower substrates, with the understanding that the phase change for TIR'ed light varies depending upon the incident angle. It is thus contemplated that a complementary phase-shift coating or structure in contact with the upper and lower surfaces can be used to adjust the phase of the TIR'ed light (preferably not adjusting the phase of non-TIR light) so that it gets totally absorbed when it reaches the next polarizer. The design of such a coating derives the benefits of U.S. Pat. No. 4,536,063, entitled "Transmissive Phase Retarder," whose contents are incorporated herein.

FIG. 13 illustrates a simple model for calculating contrast ratios in an environment with some degree of specular and/or diffuse ambient illumination. Three cases were modeled assuming a diffuse illumination of 484 lux and a specular illumination of 100 fL, for a display exhibiting a dark ambient contrast of 300:1. The three cases vary both the display's luminance (1, 10, and 100 fL), as well as varying degrees of diffuse reflectance from a viewing screen (from 0.6% to 6%).

Several things are worth noting. First, a 300:1 dark ambient contrast is quickly compromised in a moderately illuminated ambient environment, suggesting the ambient light rejection qualities of the screen should demand the same marketing attention as the inherent contrast ratio of the imaging device. Second, while increasing the luminance certainly improves ambient contrast performance, a ~2:1 contrast improvement can be achieved without any increase in power simply by reducing the diffuse reflectance of the viewing screen (the case where Y=100 fL, and the diffuse reflectance is reduced from 6% to 1.4% results in a contrast ratio increase from 25.7 to 49.5).

Figure 14:
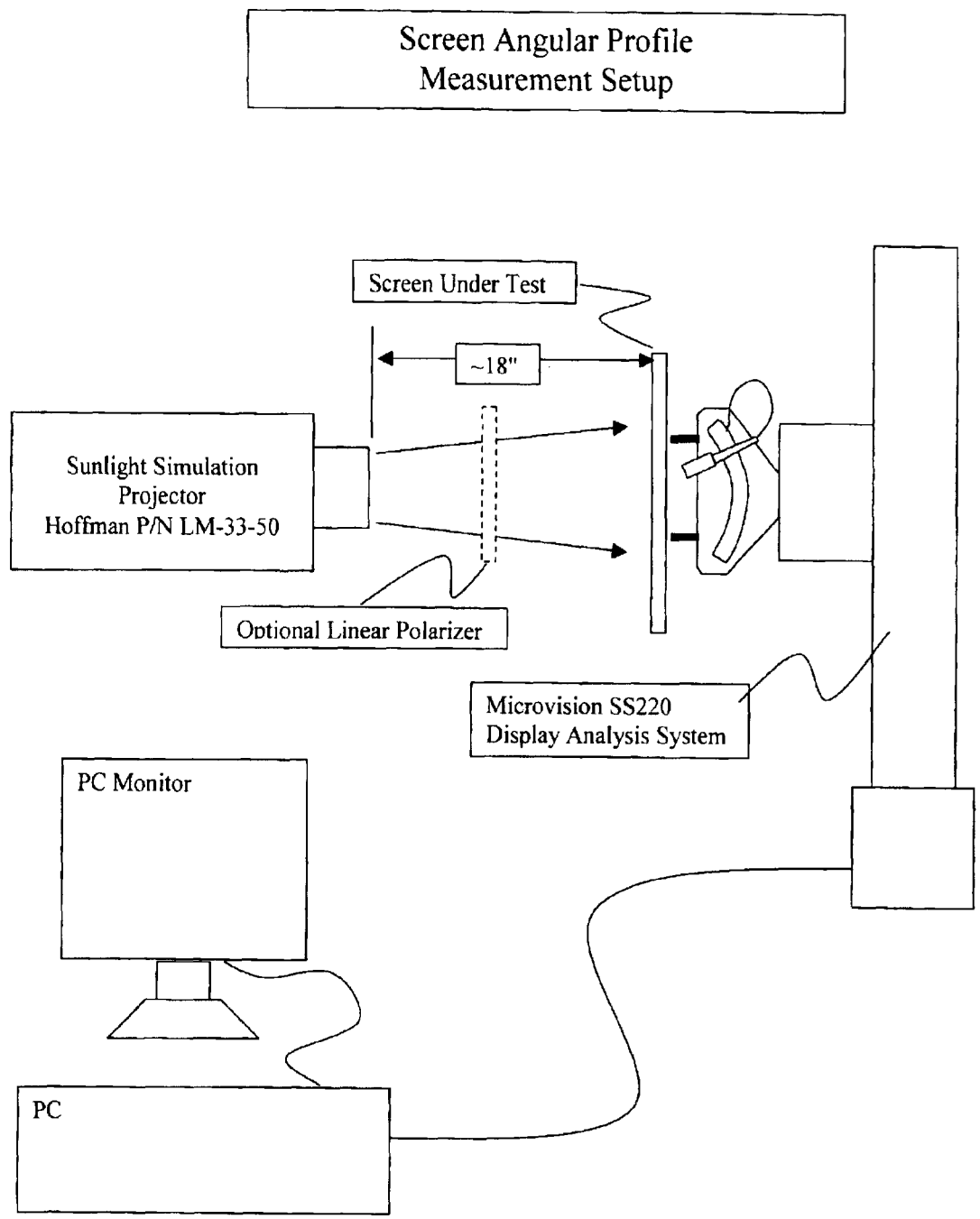
FIG. 14 shows a test setup to analyze a screens angular profile in connection with the present invention.
Figure 15:
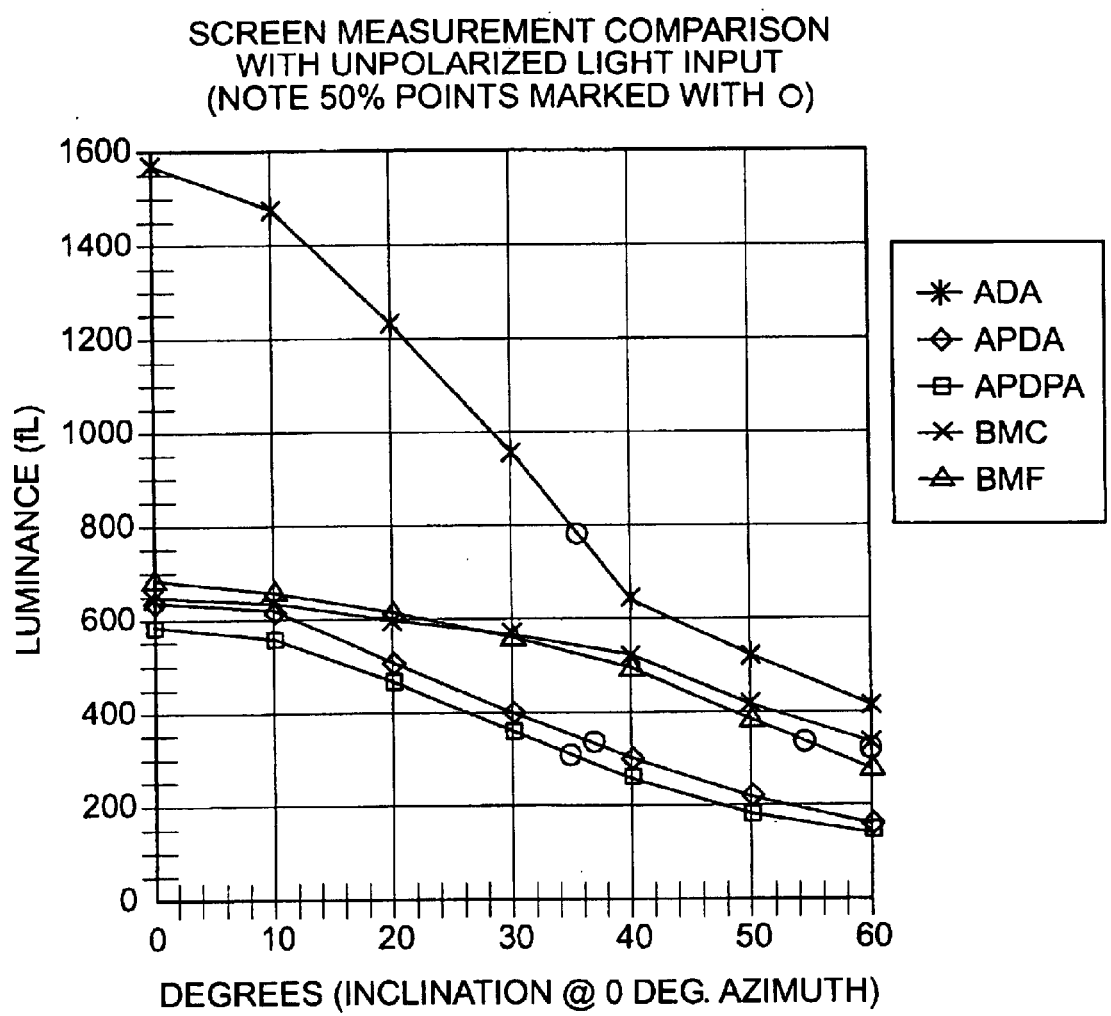
FIGS. 15–17 show data derived from screens tested with the setup shown in FIG. 14.

FIG. 14 shows an exemplary test setup for measuring the screen angular distributions. An optional linear polarizer was used for one set of measurements to simulate a linearly polarized display device. A sunlight simulator was used as the source of collimated light to emulate the projector or a collimated backlight. The measured data for several screens without the optional linear polarizer is shown in FIG. 15. The screens are defined as follows:
  ADA—AR/Diffuser/AR
  BMC—Black matrix with coarse microspheres
  BMF—Black matrix with fine microspheres
  APDA—AR/Polarizer/Diffuser/AR
  APDPA—AR/Polarizer/Diffuser/Polarizer/AR
(polarizers having pass-axis aligned)
  Several observations can be made based on this data:
  The ADA configuration, while extremely efficient, has high ambient light reflectance (9.2%), and so is best suited to dark environments
  The coarse & fine beaded screens have the same profiles
  The second polarizer in the APDPA configuration comes at a minor penalty in efficiency
  The non-beaded screens have a uniform appearance, while the beaded screens have a "dirty" looking appearance under the same illumination conditions FIG. 16, illustrates the measured data for the same screens measured in FIG. 15, but in this case with the optional linear polarizer.

An on-axis gain (i.e. ratio of luminances at 0 degrees) of about 1.7 and 1.9 is shown for the APDPA and APDA respectively, compared to the beaded screens. This ties back to FIG. 12, where the diffuser maintains polarization to a large extent, whereas the beaded screens use a neutral density black matrix, which absorbs regardless of the polarization state.

Thus, for displays employing polarized light, the non-beaded screens have a significant efficiency advantage, not to mention the other advantages as described above relative to FIG. 15. In fact, with this level of performance, one can contemplate using a polarized light source with a Digital Micromirror Device (DMD, such as that fabricated by Texas Instruments) system just to gain the high ambient contrast advantages of these non-beaded screens.

Figure 16:
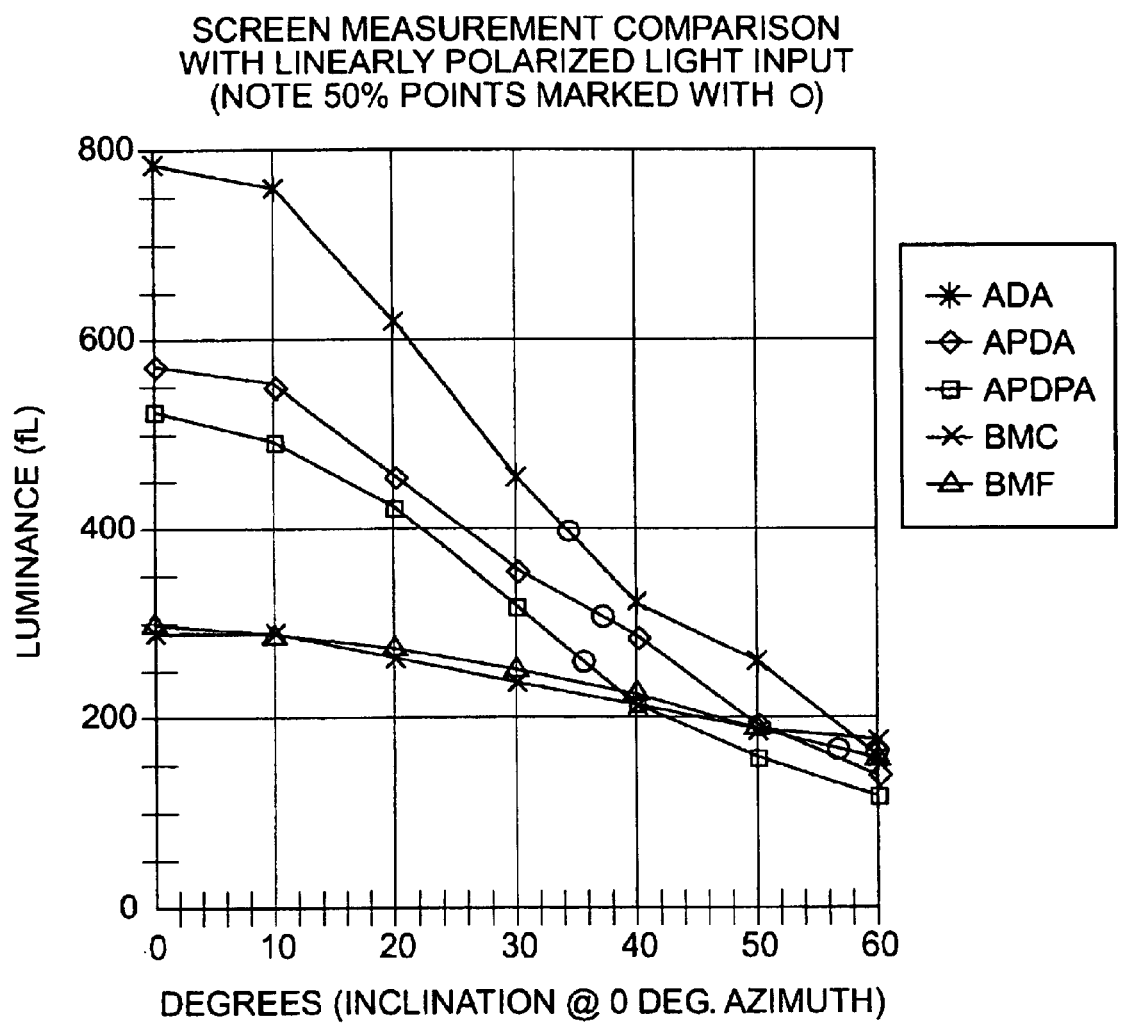
Figure 17:
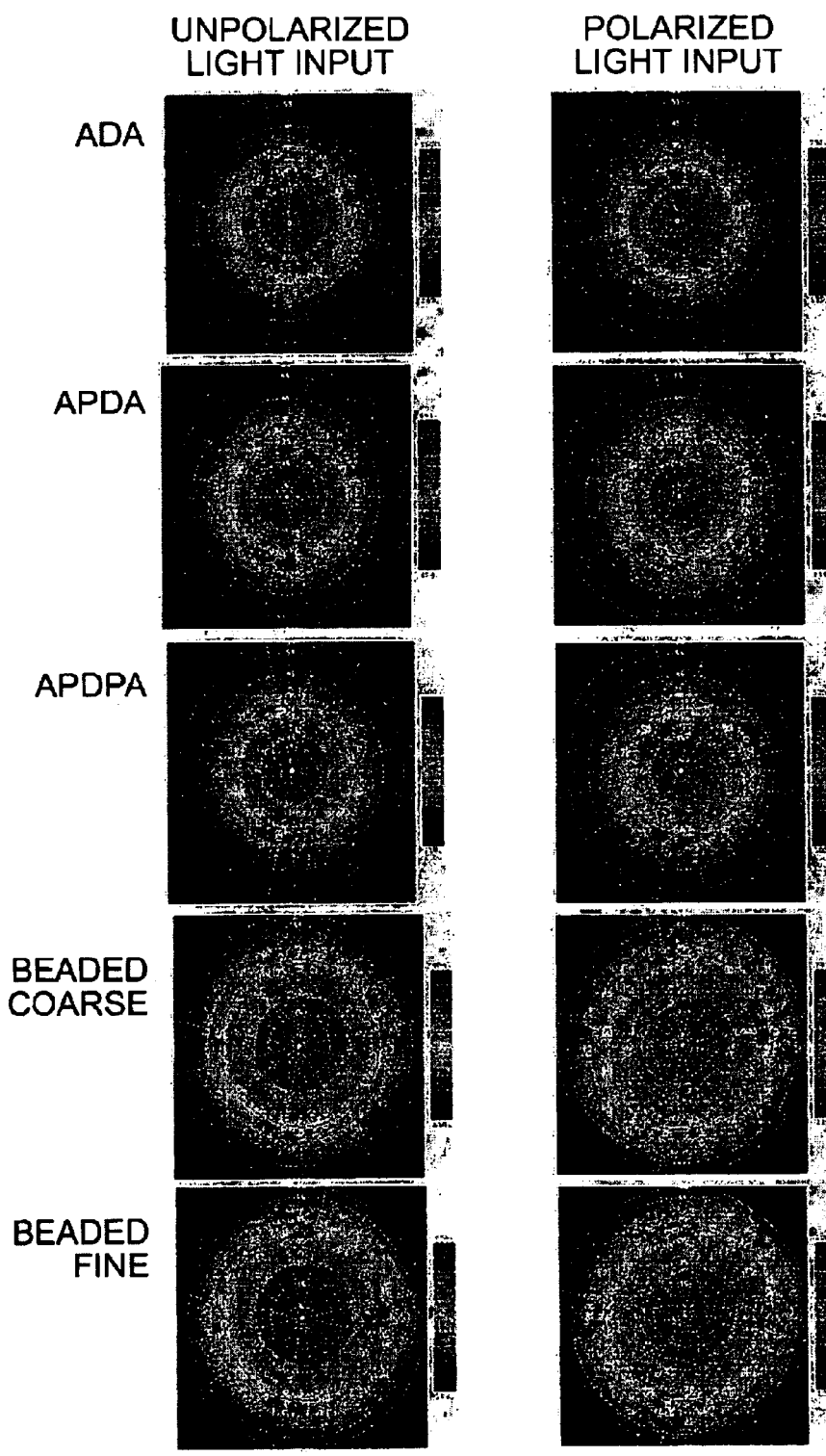

The polar plots of FIG. 17 show additional information that was not extracted for illustration in FIGS. 15 and 16. Specifically, the beaded screens show a non-uniform angular response to linearly polarized light, as exemplified by the egg-shaped nature of the two polar plots at the bottom of the right hand column. The non-beaded screens do not show this effect.

It is important to note that in the experimental setups described herein the alignment between the polarizer in front of the sunlight simulator and the screens was adjusted by eye, and not to any specific amount of precision. Also, the orthogonality between the screens and the sunlight simulator were adjusted by eye. These facts can explain the slight bias in some of the polar plots.

Figure 18:
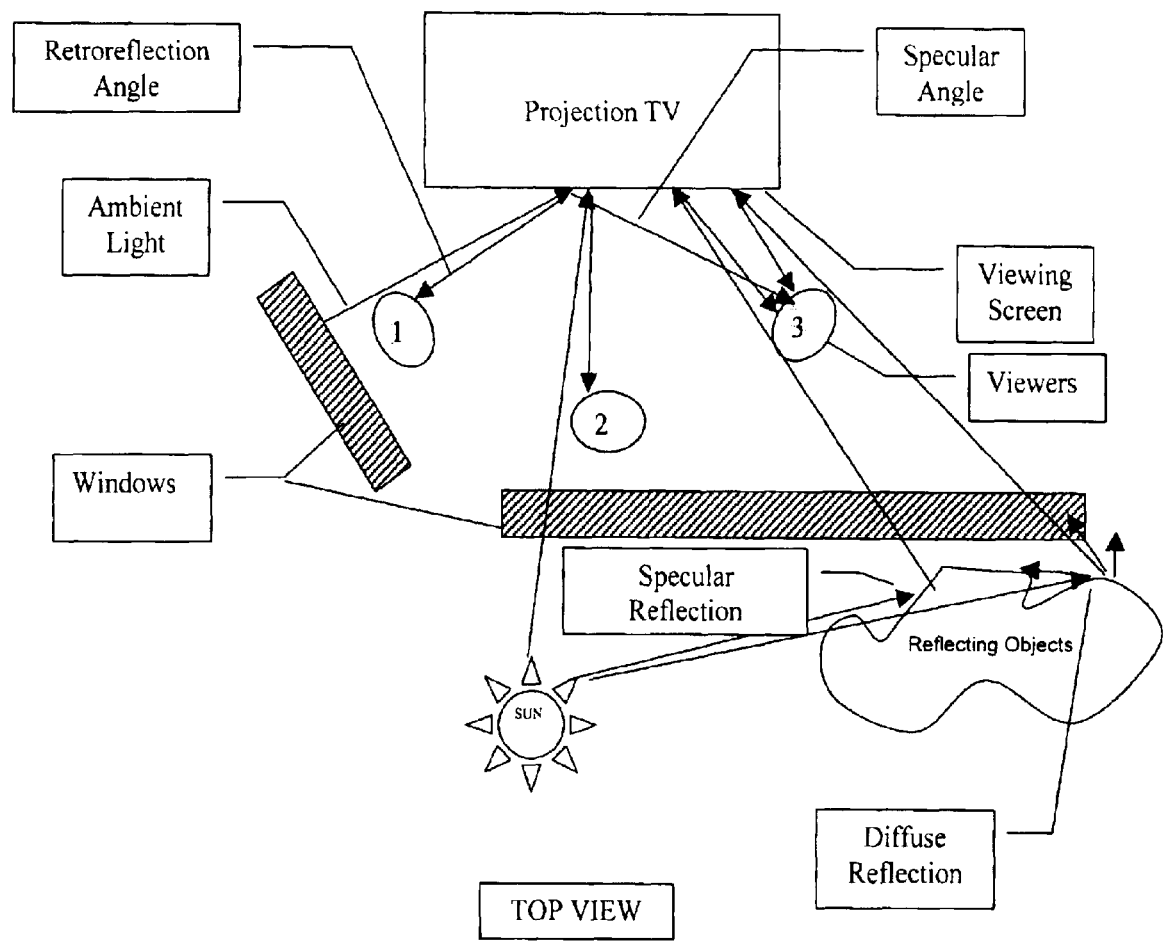
FIG. 18 shows an exemplary viewing environment for explaining retroreflections.

FIG. 18 is provided to show how retroreflections could be of concern when viewing a display with a beaded screen in a room with windows behind the viewer. A subjective test was constructed whereby an array of screens was arranged on top of a black surface, and then illuminated with a sun-gun. The beaded screens, like the non-beaded screens (those using polarizers) had good ambient light rejection, until the sun-gun was placed near the line of sight to the screen. At this point, the beaded screens exhibited a very high reflectance. It is believed that the beaded screens were acting like commercially-available beaded retroreflective sheets (e.g. those used in road signs).

As a better description of how beaded screens cause retroreflections, see U.S. Pat. No. 6,060,157 and FIGS. 6 and 7 therein. The angle of reflection is affected by the refractive index of the bead, the matrix around the beads, and the depth to which the beads are set in the matrix. Similarly, fibrous elements are known to have retroreflective characteristics (see U.S. Pat. No. 4,697,407) as well as diffusion properties for viewing screens in accordance with Northrop. One can generalize the two as having arrays of elements of substantially spherical or cylindrical form, the latter arranged parallel to the surface of the screen such that the retroreflection component is directed within the viewing zone.

In addition, faceted elements are known to exhibit both diffusion and retroreflectivity. For example, U.S. Pat. No. 4,340,275 entitled "Rear projection screen with patterned lenticular prismatic structure" vis-a-vis U.S. Pat. No. 6,012,818 entitled "Retroreflective sheeting articles". The latter introduces the term "geometric concavity" (Col. 3, lines 5~11):

"As used herein the phrase "geometric concavity" means a concavity defined by shaped protrusions which have at least two planar facets, such as prisms, pyramidal protrusions, cube-corner protrusions, and the like. The phrase does not include concavities defined by protrusions which do not include planar facets, such as protrusions present in holographic films."

It should be noted that these dual-effect diffusing/retroreflecting elements are of a size greater than the wavelength of light, and so modify the propagation of light in accordance with Snell's law, and therefore as the elements become smaller, their usefulness in the present application is not expressly discounted since diffraction effects may render the retroreflection as insignificant.

For a screen containing such dual-effect elements, strong retroreflectivity is only of concern if the concavity opens to the viewing zone, and for multifaceted elements, if the facets have an included angle of 90 degrees. For other angles other than 90 degrees, Dreyer (U.S. Pat. No. 5,889,615, FIG. 30 and Col. 15 lines 12~38) calls the facets "sparkling reflective facet pairs". That is, under ambient illumination these "reflective structures will typically reflect incident light in a direction other than the source, thereby providing a sparkling effect." This effect is also not desirable for a viewing screen.

A generalization of such dual-effect elements (spherical, cylindrical, faceted) can be describes as elements having regular geometric form. Both Chou and Abileah are examples of screens that use such elements. Specifically, Chou employs microspheres, and Abileah uses a microfaceted (BEF-like) sheet. As will be discussed, the retroreflectance of the present invention measured substantially lower than a beaded screen, thereby indicating no such features are employed.

Embodiments of the screens according to the instant invention can best be described as a laminate. In a preferred embodiment, five (5) sheets are joined via index matching adhesives—AR coated substrate, polarizer, diffuser, polarizer, and AR coated substrate, although a subset of these 5 layers may also be implemented.

The diffuser is preferably a cast sheet product, which exhibits minimal stress, thereby minimizing stress-induced birefringence.

Polarizing films themselves are known to be constructed as a laminate (see, e.g., U.S. Pat. No. 5,973,834) to protect the polarizing media from moisture.

One can consider simplifying the overall construction by laminating the polarizing material to either side of the diffuser, and then capping the assembly in AR-coated optical films. An even simpler approach would be to utilize a polarizer coating (see, e.g., U.S. Pat. No. 6,174,394) on either side of the diffuser, which is then followed by a hydrophobic AR coating.

Figure 19:
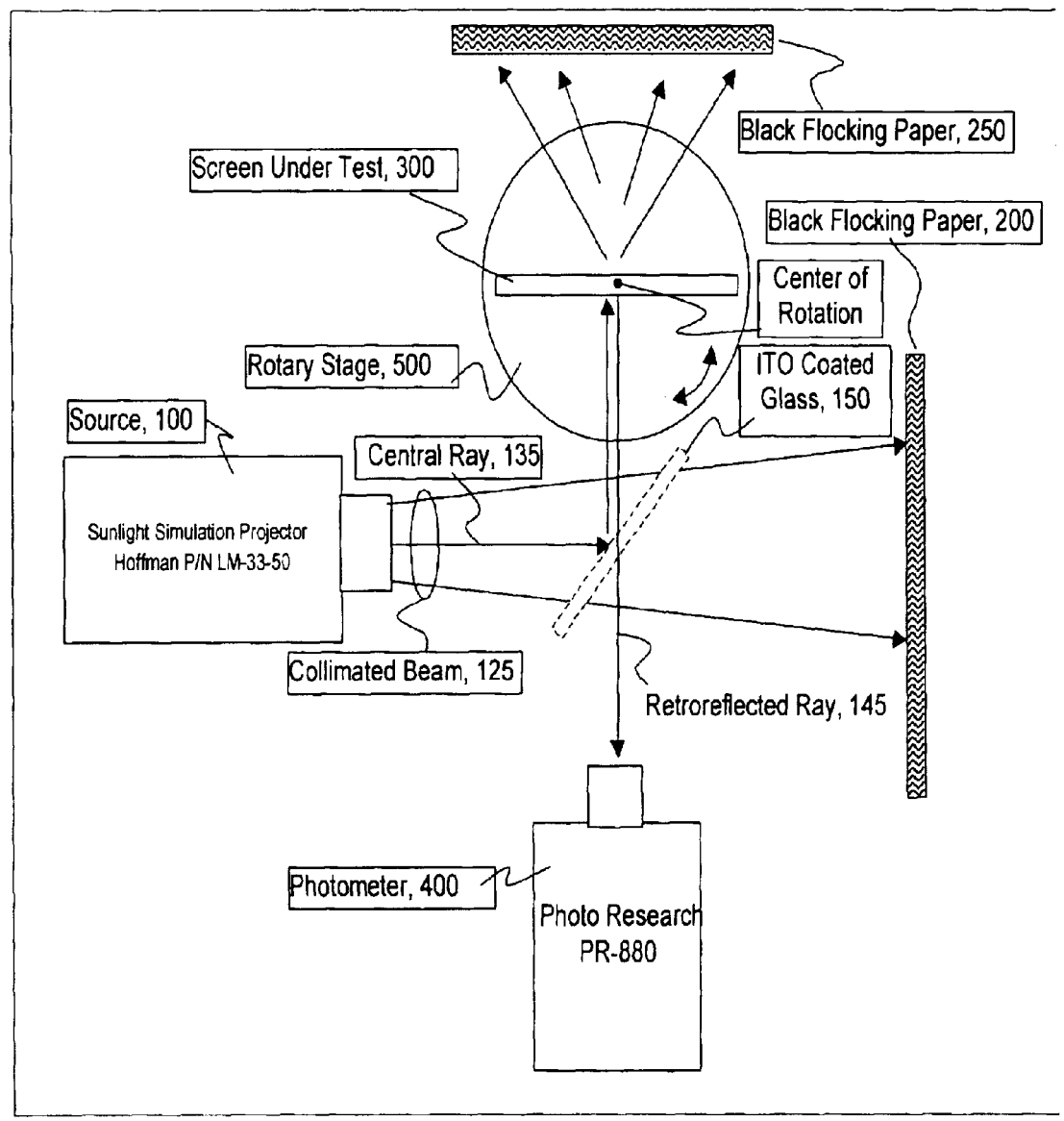
FIG. 19 shows a test setup for measuring retroreflection in connection with the present invention.

Based on these observations, the test setup shown in FIG. 19 was constructed to measure the retroreflection of a collimated source incident on a screen at various angles. Source 100 projects a collimated beam 125 through a glass substrate 150 coated with Indium Tin Oxide (ITO), onto black flocking paper 200. The ITO served to increase the fresnel reflectance towards the screen under test 300, thereby enhancing the signal/noise (S/N) of the measurements. The central ray 135 of collimated beam 125 strikes the ITO substrate at its center 155, and via fresnel reflection, a portion of the beam 140 is directed towards the screen under test 300, and a percentage thereof, 145, reflects back through the ITO substrate to the photometer 400. Another percentage travels through the screen under test 300 and is absorbed in black flocking paper 250. The screen under test 300 is mounted on a rotary stage 500, and measurements were taken at 10 degree increments, shown plotted in FIG. 20. Note that the black flocking paper significantly improved the S/N of the measurements, precluding reflections from the walls in the vicinity of the test setup from finding their way into the photometer.

Figure 20:
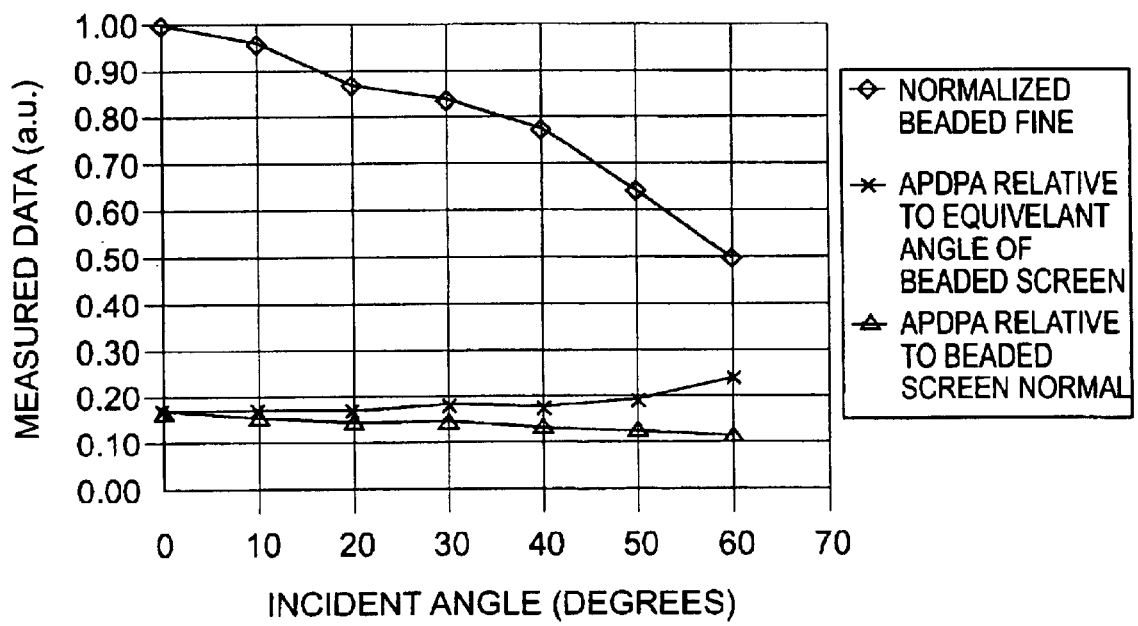
FIG. 20 shows data gleaned from screens tested with the setup of FIG. 19.

FIG. 20 shows the normalized response of the retroreflection component from a beaded screen as it is illuminated at various incident angles, and the marked difference to that measured for the APDPA (AR layer, polarizer, diffuser, polarizer, AR layer) configuration of the present invention. Specifically, the APDPA configuration demonstrated a lower retroreflectance than the beaded screen by a factor of ~5.

The following acronyms are used herein:
AMLCD Active Matrix Liquid Crystal Display
DVD Digital Video Disk
FL foot Lamberts
LCD Liquid Crystal Display
PDLC Polymer Dispersed Liquid Crystal
TAC Triacetyl-cellulose
XGA Extended Graphics Array (i.e. 1024×768 color pixels)

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A viewing screen for increasing the divergence of information-coded-light incident on its input surface, exiting its output surface into a viewing zone, having high ambient light rejection and low retroreflectance comprising:
 a diffuser, comprised of a material substantially devoid of regular geometric objects (i) distributed therein having an average size that is greater than a wavelength of said information-coded-light and (ii) having geometrical concavity open to at least a portion of said viewing zone,
 wherein said diffuser exhibits a polarization-preserving discrimination ratio of at least 2:1 throughout said viewing zone, said screen further comprising (i) at least one absorbing means and (ii) a substantially non-diffusing antireflection means on its output surface.

2. The viewing screen of claim 1, wherein said at least one ambient light absorbing means is optically coupled to said diffuser.

3. The viewing screen of claim 2, wherein the ambient-light absorbing means comprises at least one of a polarizer, a wavelength-selective absorber, a neutral density absorber, and a time-sequenced absorbing shutter.

4. The viewing screens of claim 2, wherein the ambient-light absorbing means comprises multiple polarizer layers of the linear/circular polarization type, wherein each polarizer layer has its polarization axis aligned to the other.

5. The viewing screen of claim 2, wherein the ambient-light absorbing means comprises a thin film deposition directly on said diffuser.

6. The viewing screen of claim 1, wherein said diffuser is a surface diffuser with an absorptive means in contact with its topographic features.

7. The viewing screen of claim 6, wherein said absorptive means is a deposition/coating on the top of the topographic features, a dye or impregnation within a depth starting at the topographic features, contained within the bulk of said diffuser, or some combination thereof.

8. The viewing screen of claim 1, wherein said diffuser is a volume diffuser.

9. The viewing screen of claim 1, in combination with at least one of a projection and a direct-view system.

10. The viewing screen of claim 9, wherein the system comprises a polarization-based 3D imaging application.

11. The viewing screen of claim 1, further comprising a specular reflector.

12. The viewing screen of claim 1, further comprising a fresnel-reflection reduction means.

13. The viewing screen of claim 12, wherein the fresnel-reflection reduction means comprises at least one of index-matching fluid, index-matching gel and index-matching adhesive.

14. The viewing screen of claim 12, wherein the fresnel-reflection reduction means comprises a Motheye or an equivalent nanostructure.

15. The viewing screen of claim 1, wherein the viewing screen has at least one of the following configurations: A/D/P/A, A/P/D/P, P/D/P/A, A/P/D/P/A, wherein A corresponds to an antireflective coating, D corresponds to said diffuser, and P corresponds to said ambient-light absorbing means.

16. The viewing screen of claim 15, wherein an interface between P/D layers and/or D/P layers comprises a fresnel reflection reduction means.

17. The viewing screen of claim 16, wherein the interface between the D/P layers comprises an index-matching adhesive.

18. An imaging system comprising the viewing screen of claim 1 in combination with a source of said information coded light, wherein the speckle contrast is less than 6.

19. A low-scatter polarization-preserving multilayer viewing screen for increasing the divergence of information coded light, comprising:
 a substrate for increasing the divergence of information-coded-light, while preserving its polarization state A, as it passes therethrough with a discrimination of at least 2:1 within a viewing zone;
 an absorbing polarizer on one or both sides of said substrate and aligned to pass polarization state A; and
 a polarization-state phase-shift layer for modifying the polarization state of forward-scatter and/or back-scatter that total internally reflects within said viewing screen into the state opposite of state A, said phase-shift layer being located at any position between the polarizer and an outermost surface of the viewing screen through which said information-coded light passes.

20. The viewing screen of claim 19, farther comprising fresnel-reflection reduction means in contact with the surface of one or more layers through which said information-coded light passes.

21. The viewing screen of claim 19, further comprising at least an anti-reflective coating.

22. The viewing screen of claim 19, wherein the antireflective coating comprises a thin film deposition or nanostructure applied directly to the ambient-light absorbing means or on a transparent substrate that is thereafter applied to the ambient-light absorbing means.

23. The viewing screen of claim 19, wherein said diffuser is a volume diffuser.

24. The viewing screen of claim 19, in combination with at least one of a projection and a direct-view system.

25. The viewing screen of claim 24, wherein the system comprises a polarization-based 3D imaging application.

26. An imaging system comprising the viewing screen of claim 19 in combination with a source of said information coded light, wherein the speckle contrast is less than 6.

* * * * *